US012094385B2

(12) United States Patent
You et al.

(10) Patent No.: US 12,094,385 B2
(45) Date of Patent: Sep. 17, 2024

(54) DISPLAY DEVICE

(71) Applicant: LG Display Co., Ltd., Seoul (KR)

(72) Inventors: Jaehyun You, Jeollabuk-do (KR); JooHwan Kim, Paju-si (KR); DongGeun Bae, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/351,766

(22) Filed: Jul. 13, 2023

(65) Prior Publication Data

US 2023/0351938 A1 Nov. 2, 2023

Related U.S. Application Data

(63) Continuation of application No. 17/862,041, filed on Jul. 11, 2022, now Pat. No. 11,756,468, which is a (Continued)

(30) Foreign Application Priority Data

Dec. 26, 2019 (KR) ........................ 10-2019-0174886
Jun. 30, 2020 (KR) ........................ 10-2020-0080619

(51) Int. Cl.
*G09G 3/20* (2006.01)

(52) U.S. Cl.
CPC ....... *G09G 3/20* (2013.01); *G09G 2300/0443* (2013.01); *G09G 2300/08* (2013.01); *G09G 2310/0272* (2013.01); *G09G 2380/02* (2013.01)

(58) Field of Classification Search
CPC ............. G09G 3/20; G09G 2300/0443; G09G 2300/08; G09G 2310/0272;
(Continued)

(56) References Cited

U.S. PATENT DOCUMENTS 6,100,865 A * 8/2000 Sasaki .................. G09G 3/3648 345/98
6,624,857 B1 * 9/2003 Nagata .............. G02F 1/136259 349/139
(Continued)

FOREIGN PATENT DOCUMENTS

CN 107799061 A 3/2018
CN 110494912 A 11/2019
(Continued)

OTHER PUBLICATIONS

China National Intellectual Property Administration, Office Action, Chinese Patent Application No. 202011511192.4, Nov. 1, 2023, 17 pages.
(Continued)

*Primary Examiner* — Benyam Ketema
(74) *Attorney, Agent, or Firm* — Fenwick & West LLP

(57) ABSTRACT

The present disclosure relates to display devices, and more specifically, to a display device with a sensor circuit capable of sensing the presence or absence of an abnormality in a signal line located in a bending area. Through these, a display device is provided that enables an accurate check to be performed for the presence or absence of an abnormality, such as a crack, or the like in signal lines located in the bending area, and thus, has a normal bending structure without defects.

17 Claims, 17 Drawing Sheets

Related U.S. Application Data continuation of application No. 17/119,740, filed on Dec. 11, 2020, now Pat. No. 11,417,257.

(58) Field of Classification Search
CPC ....... G09G 2380/02; G09G 2300/0842; G09G 2310/0251; G09G 2310/0262; G09G 3/3233; G09G 2300/0408; G09G 2300/0426; G09G 2300/0819; G09G 3/2074; G09G 3/006
See application file for complete search history.

(56) References Cited

U.S. PATENT DOCUMENTS

| | | | | |
|---|---|---|---|---|
| 6,853,364 | B2 * | 2/2005 | Kai | G09G 3/3688 438/30 |
| 7,525,335 | B2 * | 4/2009 | Ootaguro | G02F 1/1362 324/760.02 |
| 8,624,813 | B2 * | 1/2014 | Cho | G09G 3/3677 345/204 |
| 9,576,512 | B2 * | 2/2017 | Park | G09G 3/006 |
| 9,653,368 | B2 * | 5/2017 | Kwak | H01L 27/124 |
| 9,947,253 | B2 * | 4/2018 | Cho | G09G 3/3677 |
| 9,947,255 | B2 * | 4/2018 | Zhang | H10K 77/111 |
| 10,210,782 | B2 * | 2/2019 | Lee | G09G 3/006 |
| 10,319,750 | B2 * | 6/2019 | Park | H10K 59/8731 |
| 10,347,860 | B2 * | 7/2019 | Lee | H10K 59/35 |
| 10,381,598 | B2 * | 8/2019 | Son | H10K 59/1213 |
| 10,522,431 | B2 * | 12/2019 | Kim | H01L 27/1255 |
| 10,593,241 | B2 | 3/2020 | Hong et al. | |
| 10,643,514 | B2 * | 5/2020 | Goto | H01L 27/124 |
| 10,679,561 | B2 * | 6/2020 | Kim | G09G 3/3258 |
| 10,733,922 | B2 * | 8/2020 | Park | G09G 3/006 |
| 10,971,095 | B2 | 4/2021 | Suzuki et al. | |
| 10,997,883 | B2 * | 5/2021 | Kang | G09G 3/006 |
| 11,087,670 | B2 * | 8/2021 | Mandlik | G09G 3/3677 |
| 11,120,714 | B2 * | 9/2021 | Lee | G02F 1/136259 |
| 11,348,506 | B1 * | 5/2022 | Kim | G09G 3/20 |
| 11,348,527 | B2 | 5/2022 | Kim et al. | |
| 11,417,257 | B2 * | 8/2022 | You | G09G 3/20 |
| 11,525,746 | B2 * | 12/2022 | Bok | G01L 1/2206 |
| 11,568,818 | B2 | 1/2023 | Kim et al. | |
| 11,580,887 | B2 | 2/2023 | Lee et al. | |
| 2002/0075248 | A1 * | 6/2002 | Morita | G09G 3/3677 345/204 |
| 2003/0227441 | A1 * | 12/2003 | Hioki | G06F 3/0412 345/156 |
| 2005/0146349 | A1 * | 7/2005 | Lai | G09G 3/006 324/760.02 |
| 2009/0096770 | A1 * | 4/2009 | Kawabe | G09G 3/006 345/204 |
| 2009/0262048 | A1 * | 10/2009 | Park | G09G 3/30 345/76 |
| 2011/0018571 | A1 * | 1/2011 | Kim | G02F 1/1345 324/760.02 |
| 2011/0079789 | A1 * | 4/2011 | Yanagisawa | H01L 27/0207 257/E33.053 |
| 2012/0146886 | A1 | 6/2012 | Minami et al. | |
| 2013/0083457 | A1 * | 4/2013 | Wurzel | G02F 1/1309 700/109 |
| 2013/0155033 | A1 * | 6/2013 | Jin | G09G 3/3266 345/204 |
| 2014/0167769 | A1 * | 6/2014 | Kim | G09G 3/3208 324/414 |
| 2014/0176844 | A1 * | 6/2014 | Yanagisawa | G02F 1/1309 349/43 |
| 2015/0382446 | A1 * | 12/2015 | Kwon | G06F 1/1643 174/251 |
| 2016/0225312 | A1 * | 8/2016 | Byun | G09G 3/006 |
| 2016/0247430 | A1 * | 8/2016 | Cho | G09G 3/3677 |
| 2016/0247436 | A1 * | 8/2016 | Lee | G09G 3/2003 |
| 2016/0372017 | A1 * | 12/2016 | Byun | G09G 3/20 |
| 2018/0053466 | A1 * | 2/2018 | Zhang | G01L 1/2281 |
| 2018/0061292 | A1 * | 3/2018 | Hong | G09G 3/3233 |
| 2018/0061296 | A1 * | 3/2018 | Shim | G09G 3/3233 |
| 2018/0158741 | A1 | 6/2018 | Kim et al. | |
| 2018/0182274 | A1 * | 6/2018 | Jung | G09G 3/006 |
| 2018/0350284 | A1 | 12/2018 | Park et al. | |
| 2018/0350285 | A1 | 12/2018 | Goto et al. | |
| 2019/0066595 | A1 * | 2/2019 | Kim | G09G 3/006 |
| 2019/0067218 | A1 * | 2/2019 | Lin | H01L 27/0292 |
| 2019/0279585 | A1 * | 9/2019 | Suzuki | G09G 3/20 |
| 2019/0392743 | A1 | 12/2019 | Lee et al. | |
| 2020/0302872 | A1 | 9/2020 | Kim et al. | |
| 2021/0090479 | A1 * | 3/2021 | Cheng | G09G 3/20 |
| 2021/0390892 | A1 | 12/2021 | Lee et al. | |
| 2022/0284859 | A1 | 9/2022 | Kim et al. | |
| 2023/0169924 | A1 | 6/2023 | Kim et al. | |

FOREIGN PATENT DOCUMENTS

| | | |
|---|---|---|
| KR | 10-2016-0103615 A | 9/2016 |
| KR | 10-2019-0022980 A | 3/2019 |
| WO | WO 2018/079636 A1 | 5/2018 |

OTHER PUBLICATIONS

United States Office Action, U.S. Appl. No. 17/119,740, filed Sep. 30, 2021, 15 pages.

United States Office Action, U.S. Appl. No. 17/862,041, filed Dec. 23, 2022, 30 pages.

China National Intellectual Property Administration, Notice of Allowance, Chinese Patent Application No. 202011511192.4, Mar. 20, 2024, eight pages.

* cited by examiner

DISPLAY DEVICE

CROSS-REFERENCE TO RELATED APPLICATION

This application is a continuation of U.S. patent application Ser. No. 17/862,041 filed on Jul. 11, 2022, which is a continuation of U.S. patent application Ser. No. 17/119,740 filed on Dec. 11, 2020 which claims the priority benefit of Republic of Korea Patent Application No. 10-2019-0174886, filed on Dec. 26, 2019, and Republic of Korea Patent Application No. 10-2020-0080619, filed on Jun. 30, 2020 in the Korean Intellectual Property Office, each of which are hereby incorporated by reference in their entirety.

BACKGROUND

1. Technical Field

The present disclosure relates to a display device, and more specifically, to a display device with a bending area.

2. Description of the Related Art

As the advent of information society, there have been growing needs for various types of display devices, lighting devices, or the like. Recently, a range of display devices, such as a liquid crystal display device, an organic light emitting display device, a quantum dot display device or the like, have been developed and utilized.

Further, in addition to the development of various types of display devices, a panel design technology has been developed to reduce the size of the display device or reduce a bezel in which an image is not displayed. Among such approaches, techniques of applying a bending structure may be considerably effective to reduce the size of the display device or the size of the bezel. However, when the bending structure is applied, some problems such as cracks or short circuits in signal lines passing through the bending area have not been easily solved. Further, it is not easy even to check whether such a problem in the signal lines is present in the bending area.

SUMMARY

In accordance with embodiments of the present disclosure, in implementing a narrow bezel by applying a bending structure to a display panel, to solve such problems that it is difficult to check the presence or absence of an abnormality in signal lines located in the bending area through visual inspection or inspection equipment etc. due to some limitations in a panel structure, a panel fabricating process, or the like, a display device can be provided that is capable of accurately sensing the presence or absence of the abnormality in signal lines located in the bending area.

Through these, a display device can be provided that enables an accurate check to be performed for the presence or absence of an abnormality, such as a crack, a short circuit, or the like, in signal lines located in the bending area, and thus, has a normal bending structure without defects.

Further, a display device can be provided that enables an abnormality in signal lines which would occur in the bending area after the panel have been fabricated to be detected.

In accordance with the present disclosure, it is possible to provide a display device capable of identifying whether an abnormality in signal lines is present in the bending area or in another area except for the bending area.

While a display device with a bending area has various advantages as described above, on the other hand, the bending area is the most vulnerable in terms of the frequency of defect occurrences. Various signal lines providing signals to a driving circuit for causing pixels to emit light may pass through the bending area. Accordingly, to correct defects effectively that may occur in a display device, it may be desired to preferentially detect defects occurring in the bending area.

In accordance with one embodiment of the present disclosure, a display device is provided that includes a substrate including an active area in which a plurality of subpixels are arranged and images are displayed, and a non-active area that is an area outside of the active area, a data driving circuit that supplies data signals to the plurality of subpixels, a gate driving circuit that supplies gate signals to the plurality of subpixels, and a sensor circuit that senses the presence or absence of an abnormality in a signal line connected to the gate driving circuit. Further, the non-active area of the substrate includes a driving circuit area to which the data driving circuit is electrically connected, a bending area that is located between the driving circuit area and the active area, and that can be bent, and a link area between the bending area and the active area. The sensor circuit includes a sensing reference signal line providing a sensing reference signal, a read-out line providing a read-out signal, and a sensing transistor electrically connected to at least one signal line, the sensing reference signal line, and the read-out line. In this case, the sensor circuit may be disposed in the link area. Accordingly, it is possible to recognize accurately where an abnormality of a signal line has occurred, and correct the corresponding defect.

In accordance with one embodiment of the present disclosure, a display device is provided that includes a signal line disposed to pass the bending area, a sensor circuit connected to the signal line, and a determining circuit determining an abnormality in a signal line based on information obtained by the sensing of the sensor circuit. The sensor circuit includes a read-out line connected to the determining circuit, a sensing reference signal line providing a sensing reference signal for comparing information received by the determining circuit from the sensor circuit, a sensing transistor connected to the signal line, and a control sensing transistor connected to the sensing reference signal line, the read-out line, and the sensing transistor. Accordingly, it is possible to recognize accurately where an abnormality of a signal line has occurred, and correct the corresponding defect.

Various specific features, configurations, techniques and processes are included in detailed description and the accompanying drawings, and will be discussed in detail below.

In accordance with embodiments of the present disclosure, in implementing a narrow bezel by applying a bending structure to a display panel, to solve such a problem that it is difficult to check the presence or absence of an abnormality in signal lines located in the bending area through visual inspection or inspection equipment etc. due to some limitations in a panel structure, a panel fabricating process, or the like, a display device can be provided that is capable of accurately sensing the presence or absence of the abnormality in signal lines located in the bending area.

Further, in accordance with embodiments of the present disclosure, it is possible to provide a display device capable of detecting an abnormality in signal lines which would occur in the bending area after the panel have been fabricated.

In accordance with embodiments of the present disclosure, it is possible to provide a display device capable of identifying whether an abnormality in signal lines is present in the bending area or in another area except for the bending area.

DETAILED DESCRIPTION

Figure 1:
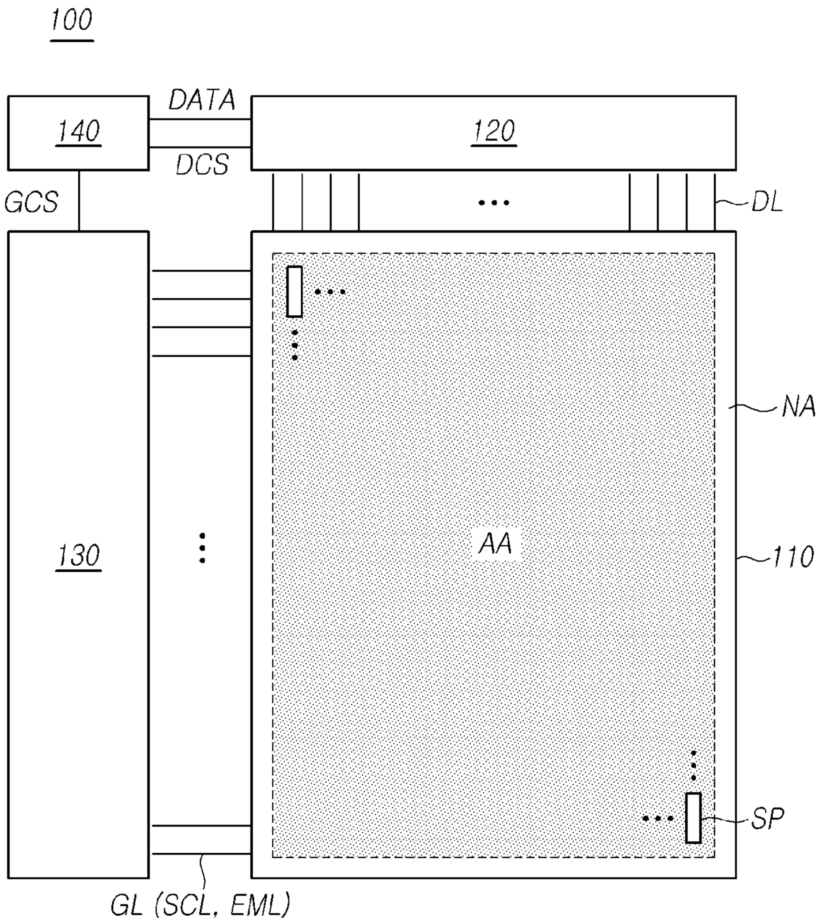
FIG. 1 illustrates a system configuration of an electronic device according to one embodiment of the present disclosure.

When applying a bending structure to a display panel to implement a narrow bezel, since some problems may frequently occur such as a crack or a short circuit in signal lines arranged in a bending area, a defect rate significantly increases by disposing the bending structure on the display panel. A process defect that can be immediately identified, resulted from a bending process issue or a design defect, causes a crack in a signal line, which leads to an abnormality on a viewing screen as a data signal or a GIP signal is not timely provided. On the other hand, a minute crack or line electrolytic corrosion that can be identified after a relatively long period of time, or a defect due to corrosion causes a corresponding signal to be provided gradually and weakly, leading reliability specifications not to be satisfied. Since several layers are disposed over or under the signal lines arranged in the bending area, it is therefore not easy to check whether a crack or a short circuit is present in signal lines arranged in the bending area through visual inspection or inspection equipment etc.

In order to check a crack or a short circuit in signal lines located in the bending area, when several layers disposed over or under the signal lines arranged in the bending area are removed, the signal lines can also be damaged, which makes it difficult to identify a defect.

Further, since several processes are needed to be performed after the bending process is performed, in case such consecutive processes are performed in a state where an associated defect is not recognized, a process time and a manufacturing cost can increase, and a corresponding product development period can be delayed because reliability failure analysis is not performed timely.

To address such issues, in the present disclosure, embodiments are provided for enabling a display device to sense the presence or absence of an abnormality in signal lines located in a bending area. Through these, a display device can be provided that enables an early check whether a crack, or the like, in signal lines located in the bending area is present, and thus, has a normal bending structure with reduced manufacturing costs.

In the present disclosure, embodiments are provided for enabling a display device to identify whether an abnormality in signal lines is present in a bending area or in another area except for the bending area.

Further, in the present disclosure, embodiments are provided for a display device with a sensor circuit for sensing whether an abnormality in signal lines located in a bending area is present.

The advantages and features of the present disclosure and methods of achieving the same will be apparent by referring to embodiments of the present disclosure as described below in detail with reference to the accompanying drawings. It should be noted that the present disclosure is not limited to embodiments set forth below and may be implemented in various different forms. Thus, embodiments of the present disclosure are provided for specifically describing the present disclosure and for specifically informing those skilled in the art to which it pertains of the scope of the present disclosure, and the scope of the present invention is defined only by the scope of the appended claims.

In addition, the shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description of the present disclosure, detailed description of well-known functions and configurations incorporated herein will be omitted when it is determined that the description may make the subject matter in some embodiments of the present disclosure rather unclear.

The terms, such as "including," "having," "containing," "comprising of," or the like, used herein are generally intended to allow other components to be added unless the terms are used with the term "only". Singular forms used herein are intended to include plural forms unless the context clearly indicates otherwise.

In interpreting any elements or features of the embodiments of the present disclosure, it should be considered that any dimensions and relative sizes of layers, areas and regions include a tolerance or error range even when a specific description is not conducted.

Spatially relative terms, such as, "on", "over, "above", "below", "under", "beneath", "lower", "upper", "near", "close", "adjacent", and the like, may be used herein to describe one element or feature's relationship to another element(s) or feature(s) as illustrated in the figures, and it should be interpreted that one or more elements may be further "interposed" between the elements unless the terms such as 'directly', "only" are used.

Time relative terms, such as "after" "subsequent to," "next," "before," or the like, used herein to describe a temporal relationship between events, operations, or the like are generally intended to include events, cases, operations, or the like that do not occur consecutively unless the terms, such as 'directly'" "immediately," or the like, are used.

When the terms, such as "first," "second," or the like, are used herein to describe various elements or components, it should be considered that these elements or components are not limited thereto. These terms are merely used herein for distinguishing an element from other elements. Therefore, a first element mentioned below may be a second element in a technical concept of the present disclosure.

It should be understood that the term "at least one" used herein may include all combinations obtained by combining one or more associated elements. For example, "at least one of a first item, a second item and a third item" may include all combinations obtained by two or more of the first item, the second item and the third item, as well as each of the first item, the second item and the third item.

The elements or features of various exemplary embodiments of the present disclosure can be partially or entirely bonded to or combined with each other and can be interlocked and operated in technically various ways as can be fully understood by a person having ordinary skill in the art, and the various exemplary embodiments can be carried out independently of or in association with each other.

Hereinafter, an example of a display device in accordance with embodiments of the present disclosure will be discussed in detail with reference to accompanying drawings. In denoting elements of the drawings by reference numerals, the same elements will be referenced by the same reference numerals although the elements are illustrated in different drawings. Scale of the components shown in the accompanying drawings is illustrated for convenience of description and may be different from actual scale; thus, embodiments of the present disclosure are not limited to the scale shown in the drawings.

FIG. 1 illustrates a system configuration of an electronic device 100 according to one embodiment of the present disclosure.

Referring to FIG. 1, a display device 100 in accordance with one embodiment of the present disclosure includes a display panel 110 in which a plurality of data lines DL and a plurality of gate lines GL are arranged and a plurality of sub-pixels SP connected to the plurality of data lines DL and the plurality of gate lines GL is arranged, and a driving circuit for driving the display panel 110.

In a functional aspect, the driving circuit may include a data driving circuit 120 driving the plurality of data lines DL, a gate driving circuit 130 driving the plurality of gate lines GL, a controller 140 controlling the data driving circuit 120 and the gate driving circuit 130, and the like.

The display panel 110 may include an active area AA in which images are displayed, and a non-active area NA that is an area outside of the active area AA. The plurality of sub-pixels SP may be arranged in the active area AA, and the plurality of data lines DL for delivering data signals and the plurality of gate lines GL for delivering gate signals to the plurality of sub-pixels SP may be arranged in the active area AA.

The plurality of data lines DL arranged in the active area AA may extend up to the non-active area NA, and be electrically connected to the data driving circuit 120 electrically connected to the display panel 110. In another example, the plurality of data lines DL arranged in the active area AA may be electrically connected to a plurality of data link lines arranged in the non-active area NA, respectively. The plurality of data lines DL may be electrically connected to the data driving circuit 120 through the respective connected data link lines. Hereinafter, for convenience of description and ease of the understanding, regardless of whether a data line DL has an extended part served as a data link line or the data line DL is connected to a separate data link line, a line having an electrical state identical to the data line DL and disposed in the non-active area NA is referred to as "data link line".

The plurality of gate lines GL arranged in the active area AA may be electrically connected to the gate driving circuit 130 that is disposed in, or electrically connected with, the non-active area NA.

Gate driving related lines needed for allowing the gate driving circuit 130 to generate or drive gate signals may be arranged in the non-active area NA. The arrangement of such gate driving related lines in the non-active area NA of the display panel 110 is referred to as a line on glass (LOG) type or a line on panel (LOP) type.

For example, the gate driving related lines may include one or more high-level gate voltage lines for delivering a high-level gate voltage to the gate driving circuit 130, one or more low-level gate voltage lines for delivering a low-level gate voltage to the gate driving circuit 130, a plurality of clock lines for delivering a plurality of clock signals to the gate driving circuit 130, and one or more start lines for delivering one or more start signals to the gate driving circuit 130, or the like.

The plurality of data lines DL and the plurality of gate lines GL may be arranged to intersect each other in the display panel 110; however, embodiments of the present disclosure are not limited thereto. For example, the plurality of data lines DL may be arranged in rows or columns, and the plurality of gate lines GL may be arranged in columns or rows. Hereinafter, for convenience of description and ease of understanding, it is assumed that the plurality of data lines DL is arranged in columns and the plurality of gate lines GL is arranged in rows.

The controller 140 controls operations of the data driving circuit 120 and the gate driving circuit 130 by supplying various types of control signals (DCS, GCS) needed for operating or driving the data driving circuit 120 and the gate driving circuit 130.

The controller 140 starts image data scan according to timings processed in each frame, converts image data input from other devices or outer image providing sources to be adapted to a data signal form used in the data driving circuit 120 and then outputs image data DATA resulted from the converting, and controls the driving of a data line at a pre-configured time according to the image data scan.

The controller 140 receives, from outer image providing sources (e.g., a host system), various types of timing signals including a vertical synchronous signal Vsync, a horizontal synchronous signal Hsync, an input data enable signal DE, a clock signal CLK, or the like, along with the input image data.

In addition to converting image data input from the outer image providing sources to be adapted to a data signal form used in the data driving circuit 120 and then outputting image data DATA resulted from the conversion, in order to control the data driving circuit 120 and the gate driving circuit 130, the controller 140 receives one or more timing signal(s) of the vertical synchronous signal Vsync, the horizontal synchronous signal Hsync, the data input signal DE, the clock signal CLK, and/or the like, generates several types of control signals, and then supplies the generated control signals to the data driving circuit 120 and the gate driving circuit 130.

For example, to control the gate driving circuit 130, the controller 140 outputs several types of gate control signals GCS including a gate start pulse GSP, a gate shift clock GSC, a gate output enable signal GOE, or the like. Here, the gate start pulse GSP is used for controlling an operation start timing of one or more gate-driver integrated circuits G-DIC included in the gate driving circuit 130. The gate shift clock GSC is a clock signal commonly input to the one or more gate driver integrated circuits and is used for controlling a shift timing of a scan signal (a gate pulse). The gate output enable signal GOE is used for indicating timing information of one or more gate driver integrated circuits.

Further, to control the data driving circuit 120, the controller 140 outputs several types of data control signals DCS including a source start pulse SSP, a source sampling clock SSC, a source output enable signal SOE, or the like. Here, the source start pulse SSP is used for controlling a data sampling start timing of one or more source-driver integrated circuits included in the data driving circuit 120. The source sampling clock SSC is a clock signal for controlling a sampling timing of data in each source-driver integrated circuit. The source output enable signal SOE is used for controlling an output timing of the data driving circuit 120.

The controller 140 may be a timing controller used in the typical display technology or a control apparatus/device capable of additionally performing other control functionalities in addition to the typical function of the timing controller.

The controller 140 may be implemented as a separate component from the data driving circuit 120, or implemented as an integrated circuit integrated with the data driving circuit 120.

The data driving circuit 120 drives a plurality of data lines DL by receiving image data DATA from the controller 140 and then providing data signals to the plurality of data lines DL. Here, the data driving circuit 120 may also be referred to as a source driving circuit.

The data driving circuit 120 may be implemented by including one or more source-driver integrated circuits. Each source-driver integrated circuit S-DIC may include a shift register, a latch circuit, a digital to analog converter DAC, an output buffer, or the like. Each source-driver integrated circuit S-DIC may further include one or more analog to digital converters ADC.

Each source-driver integrated circuit S-DIC may be connected to a conductive pad such as a bonding pad of the display panel 110 in a tape automated bonding (TAB) type, in a chip on glass (COG) type, or in a chip on panel (COP) type, or be directly disposed on the display panel 110. In some instances, the source-driver integrated circuit S-DIC may be disposed to be integrated into the display panel 110. Further, each source-driver integrated circuit S-DIC may be implemented in a chip on film (COF) type, in which it is mounted on a source-circuit film connected to the display panel 110.

Hereinafter, for convenience of description and ease of the understanding, the data driving circuit 120 is implemented as one source-driver integrated circuit S-DIC and connected to the display panel 110 in the chip on glass (COG) type or in the chip on panel (COP) type.

The gate driving circuit 130 sequentially drives a plurality of gate lines GL by sequentially supplying scan signals to the plurality of gate lines GL. Here, the gate driving circuit 130 may also be referred to as a scan driving circuit.

The gate driving circuit 130 may include a shift register, a level shifter, and the like.

The gate driving circuit 130 may be connected to a conductive pad such as a bonding pad of the display panel 110 in the tape automated bonding (TAB) type, in the chip on glass (COG) type, or in the chip on panel (COP) type, or be directly disposed on the display panel 110 by being implemented in a gate in panel (GIP) type. In some instances, the gate driving circuit 130 may be disposed to be integrated into the display panel 110. Further, the gate driving circuit 130 may be implemented in a chip on film (COF) type, in which it is mounted on a gate-circuit film connected to the display panel 110 by being implemented as a plurality of gate-driver integrated circuits G-DIC.

Hereinafter, for convenience of description and ease of the understanding, discussions are conducted based on a situation in which the gate driving circuit 130 includes a plurality of gate drivers, and the plurality of gate drivers are arranged in the non-active area NA of the display panel 110 by being implemented in the gate in panel (GIP) type.

According to the control of the controller 140, the gate driving circuit 130 sequentially supplies scan signals with a turn-on voltage level or a turn-off voltage level to a plurality of gate lines GL.

When a specific gate line is asserted by a scan signal from the gate driving circuit 130, the data driving circuit 120 converts image data DATA received from the controller 140 into data signals in the form of analog signal and supplies the resulted data signals to a plurality of data lines DL.

The data driving circuit 120 may be located on, but not limited to, only one side (e.g., an upper side, a lower side, a left side, or a right side) of the panel 110, or in some embodiments, be located on, but not limited to, two sides (e.g., the upper side and the lower side, or the left side and the right side) of the panel 110 according to driving schemes, panel design schemes, or the like.

The gate driving circuit 130 may be located on, but not limited to, only one side (e.g., a left side, a right side, an upper side, or a lower side) of the panel 110, or in some instances, be located on, but not limited to, two sides (e.g., the left side and the right side, or the upper side and the lower side) of the display panel 110 according to driving schemes, panel design schemes, or the like.

The plurality of gate lines GL arranged in the display panel 110 may include a plurality of scan lines SCL and a plurality of light emitting control lines EML, and the like. The plurality of scan lines SCL and the plurality of light emitting control lines EML are lines for delivering different types of gate signals from each other (e.g., scan signals, light emitting control signals) to gate nodes of different types of transistors from each other (e.g., scan transistors, light emitting control transistors).

Accordingly, the gate driving circuit 130 may include a plurality of scan drivers (GIP SCAN1, GIP SCAN2 in FIG. 3) outputting scan signals to a plurality of scan lines SCL that is a type of the gate line GL, and a plurality of light emitting control drivers (GIP EM1, GIP EM2) outputting light emitting control signals to a plurality of light emitting control lines EML that is another type of the gate line GL.

Meanwhile, the display device 100 in accordance with embodiments of the present disclosure may be a non-self-emissive display requiring a backlight unit, such as, the liquid crystal display (LCD), or be a self-emissive display, such as the organic light emitting diode (OLED) display, the quantum dot display, the micro light emitting diode (LED) display, or the like.

In case the display device 100 in accordance with embodiments of the present disclosure is the OLED display, each sub-pixel SP may include an OLED where the OLED itself emits light as a light emitting element ED. In case the display device 100 in accordance with embodiments of the present disclosure is a quantum dot display, each sub-pixel SP may include a light emitting element ED made of a quantum dot, which is a semiconductor crystal where the semiconductor crystal itself emits light. In case the display device 100 in accordance with embodiments of the present disclosure is a micro LED display, each sub-pixel SP may include a micro LED where the micro LED itself emits light and which is made based on an inorganic material as a light emitting element ED.

Figure 2:
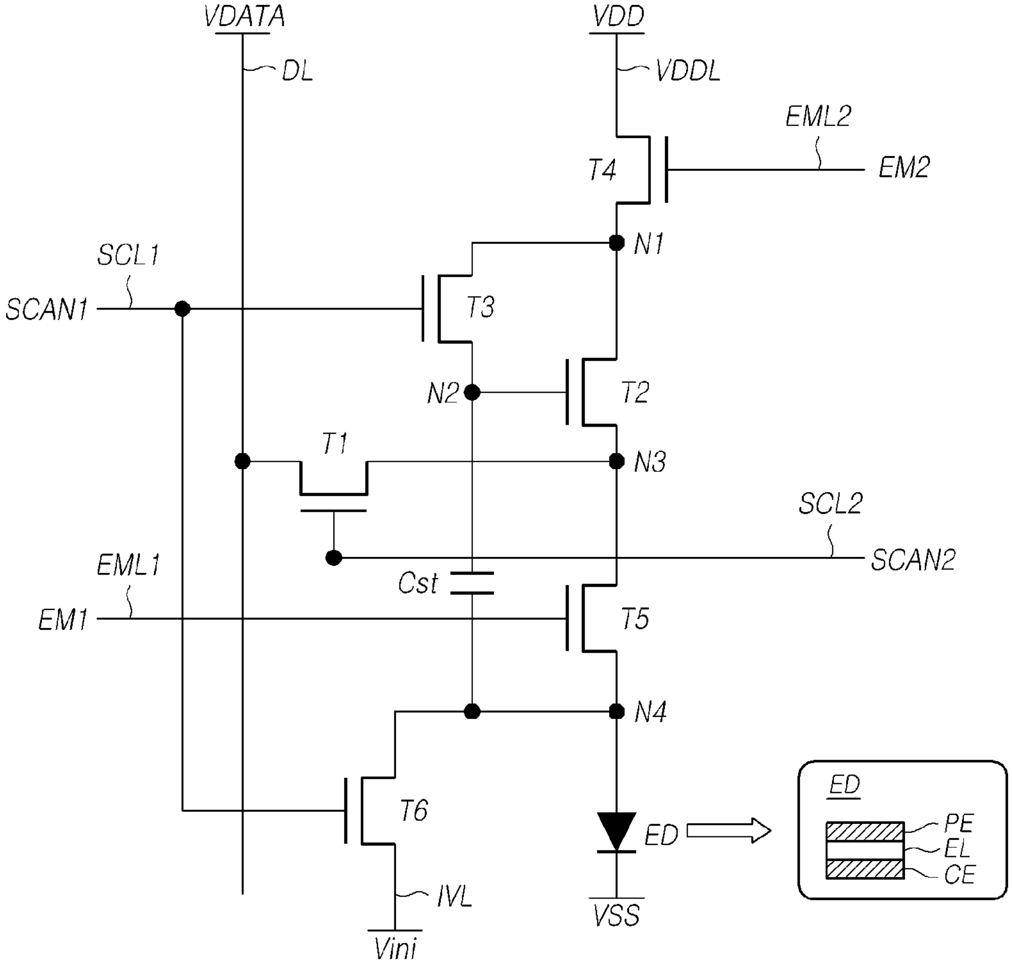
FIG. 2 illustrates an equivalent circuit of a sub-pixel applied to the display device according to one embodiment of the present disclosure.

FIG. 2 illustrates an equivalent circuit of a sub-pixel SP applied to the display device 100 according to an embodiment of the present disclosure.

Referring to FIG. 2, in case the display device 100 in accordance with one embodiment of the present disclosure is a self-emissive display, each sub-pixel SP may include a light emitting element ED where the light emitting element itself emits light, two or more transistors (e.g., a driving transistor, a scan transistor, and the like) for driving the light emitting element ED, and one or more capacitors (e.g., a storage capacitor, and the like).

The equivalent circuit of the sub-pixel SP in FIG. 2 shows an example of a sub-pixel structure in which 6 transistors (T1~T6) and 1 capacitor Cst are included for driving the light emitting element ED. The sub-pixel SP of FIG. 2 is referred to as "6T(Transistor)1C(Capacitor) structure". Further, the 6T1C structure shown in FIG. 2 is served as an internal-compensating-used driving circuit capable of compensating for a threshold voltage of a second transistor T2 in order to provide accurately a driving current corresponding to a data signal DATA to a light emitting element ED. The equivalent circuit of the sub-pixel SP in FIG. 2 represents one example of possible circuits. Therefore, embodiments of the present disclosure are not limited thereto, and various pixel circuits may be applied to the display device 100.

Referring to FIG. 2, in order to drive the sub-pixel SP with the 6T1C structure, a plurality of gate lines GL can be arranged in the display panel 110, such as, a plurality of first scan lines SCL1 for delivering first scan signals SCAN1, a plurality of second scan lines SCL2 for delivering second scan signals SCAN2, a plurality of first light emitting control lines EML1 for delivering first light emitting control signals EM1, and a plurality of second light emitting control lines EML2 for delivering second light emitting control signals EM2.

Referring to FIG. 2, each sub-pixel SP may include a light emitting element ED, first to sixth transistors (T1~T6) and a storage capacitor Cst, and include four nodes (N1, N2, N3, N4).

The light emitting element ED may include a first electrode PE and a second electrode CE and include a light emitting layer EL located between the first electrode PE and the second electrode CE. The first electrode PE may be disposed in each sub-pixel SP and be a pixel electrode to which a unique driving voltage of each sub-pixel SP is applied. The second electrode CE may be commonly disposed for all sub-pixels SP and be a common electrode to which a common voltage needed for driving all sub-pixels SP is applied. Here, the common voltage may be a low-level voltage VSS, such as a ground voltage or the like. The first electrode PE may be an anode electrode (or a cathode electrode), and the second electrode CE may be the cathode electrode (or the anode electrode).

For example, the light emitting element ED may be an organic light emitting diode (OLED) of the OLED display, a quantum dot light emitting element of the quantum dot display, a micro light emitting diode (LED) of the micro LED display, or the like.

The fourth transistor T4 may be controlled by the second light emitting control signal EM2, and be connected between a driving voltage line VDDL for delivering a driving voltage VDD and the first node N1. The turn-on of fourth transistor T4 can enable the light emitting element ED to emit light and allow luminescence period to be determined.

The third transistor T3 may be controlled by the first scan signal SCAN1, and be connected between the first node N1 and the second node N2. The second node N2 may be a gate node of the second transistor T2. The turn-on of the third transistor T3 can enable a threshold voltage of a second transistor T2 to be sampled The second transistor T2 may be controlled by a voltage of the second node N2 that is a gate node thereof, and be connected between the first node N1 and the third node N3. In a functional aspect, the second transistor T2 may be a driving transistor.

The first transistor T1 may be controlled by the second scan signal SCAN2, and be connected between a data line DL and the third node N3. The first transistor T1 provides a data signal VDATA to the source node of the driving transistor.

The fifth transistor T5 may be controlled by the first light emitting control signal EM1, and be connected between the fourth node N4 and the third node N3. The fourth node N4 may be connected to the first electrode PE of the light emitting element ED. As the fifth transistor T5 is turned on together with the fourth transistor T4, the light emitting element ED can emit light.

The sixth transistor T6 may be controlled by the first scan signal SCAN1, and be connected between an initialization voltage line IVL for delivering an initialization voltage Vini and the fourth node N4. The turn-on of the sixth transistor T6 can enable the initialization voltage Vini to be applied to the electrode of the light emitting element ED connected to the fourth transistor T4, and thus, cause the light emitting element ED to be discharged to the initialization voltage Vini.

The storage capacitor Cst may be connected between the second node N2 and the fourth node N4. The second node N2 may be a gate node of the second transistor T2 that is the driving transistor or a node (an electrode pattern or a location) with an electrical state identical to the gate node of the second transistor T2, and the fourth node N4 may be the first electrode PE of the light emitting element ED or a node (an electrode pattern or a location) with an electrical state identical to the first electrode PE of the light emitting element ED. The storage capacitor Cst can maintain, at a predetermined level, a voltage in the gate electrode of the driving transistor so that the driving transistor can apply a constant driving current to the light emitting element ED.

The storage capacitor Cst may be an external capacitor that is intentionally designed outside of the transistor, not a parasitic capacitor (e.g., Cgs, Cgd) that is an internal capacitor present itself.

Each of the first to sixth transistors (T1~T6) may be an n-type transistor or a p-type transistor. In case each of the first to sixth transistors (T1~T6) is the n-type transistor, a gate voltage for turning on each of the first to sixth transistors (T1~T6) may be a high-level gate voltage and a gate voltage for turning off each of the first to sixth transistors (T1~T6) may be a low-level gate voltage. In case each of the first to sixth transistors (T1~T6) is the p-type transistor, a gate voltage for turning on each of the first to sixth transistors (T1~T6) may be a low-level gate voltage and a gate voltage for turning off each of the first to sixth transistors (T1~T6) may be a high-level gate voltage. Hereinafter, for convenience of description, discussions are conducted based on the n-type transistor.

Figure 3:
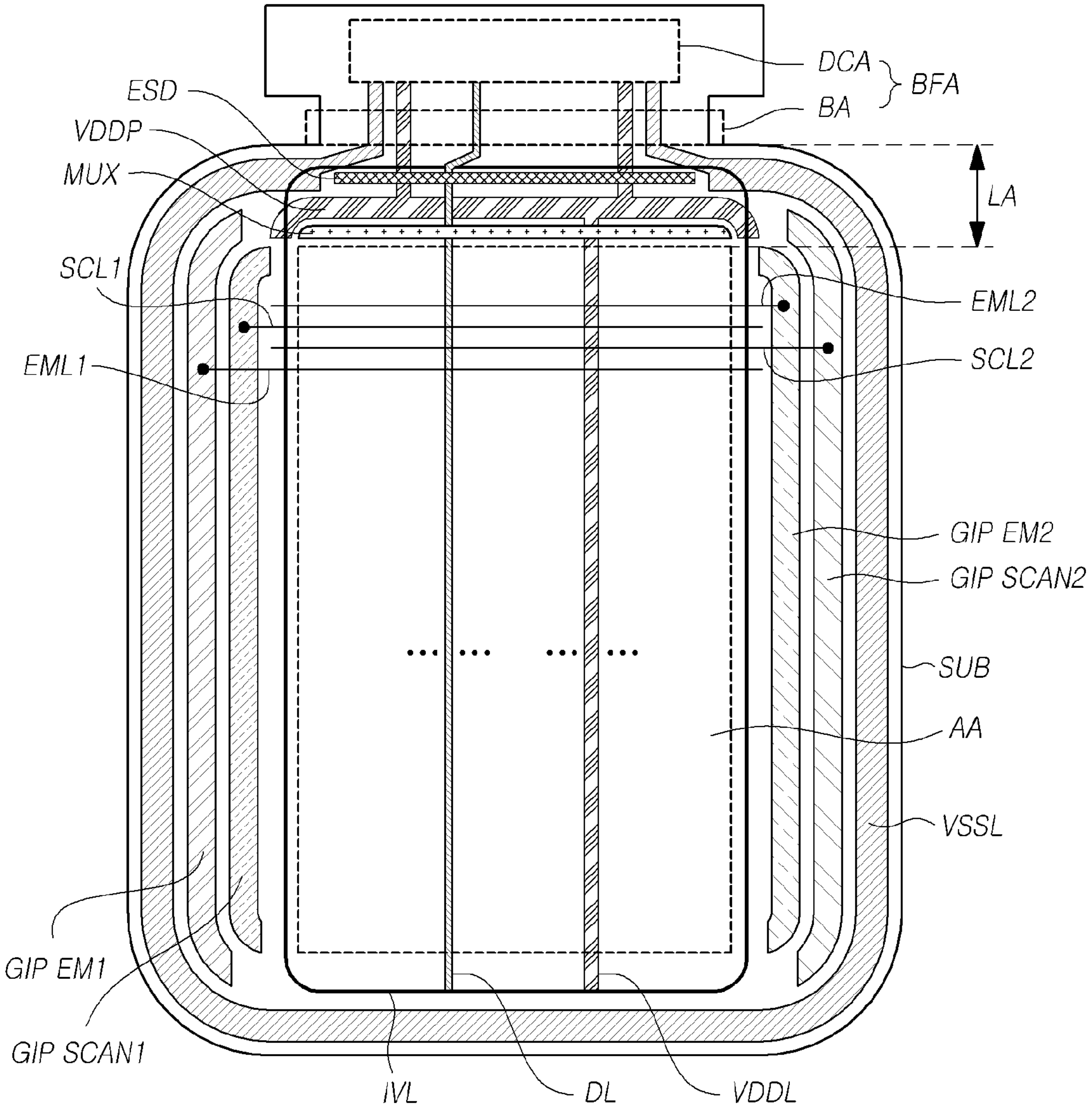
FIG. 3 is a plan view schematically illustrating bending and wiring structures of a display panel according to one embodiment of the present disclosure.
Figure 4:
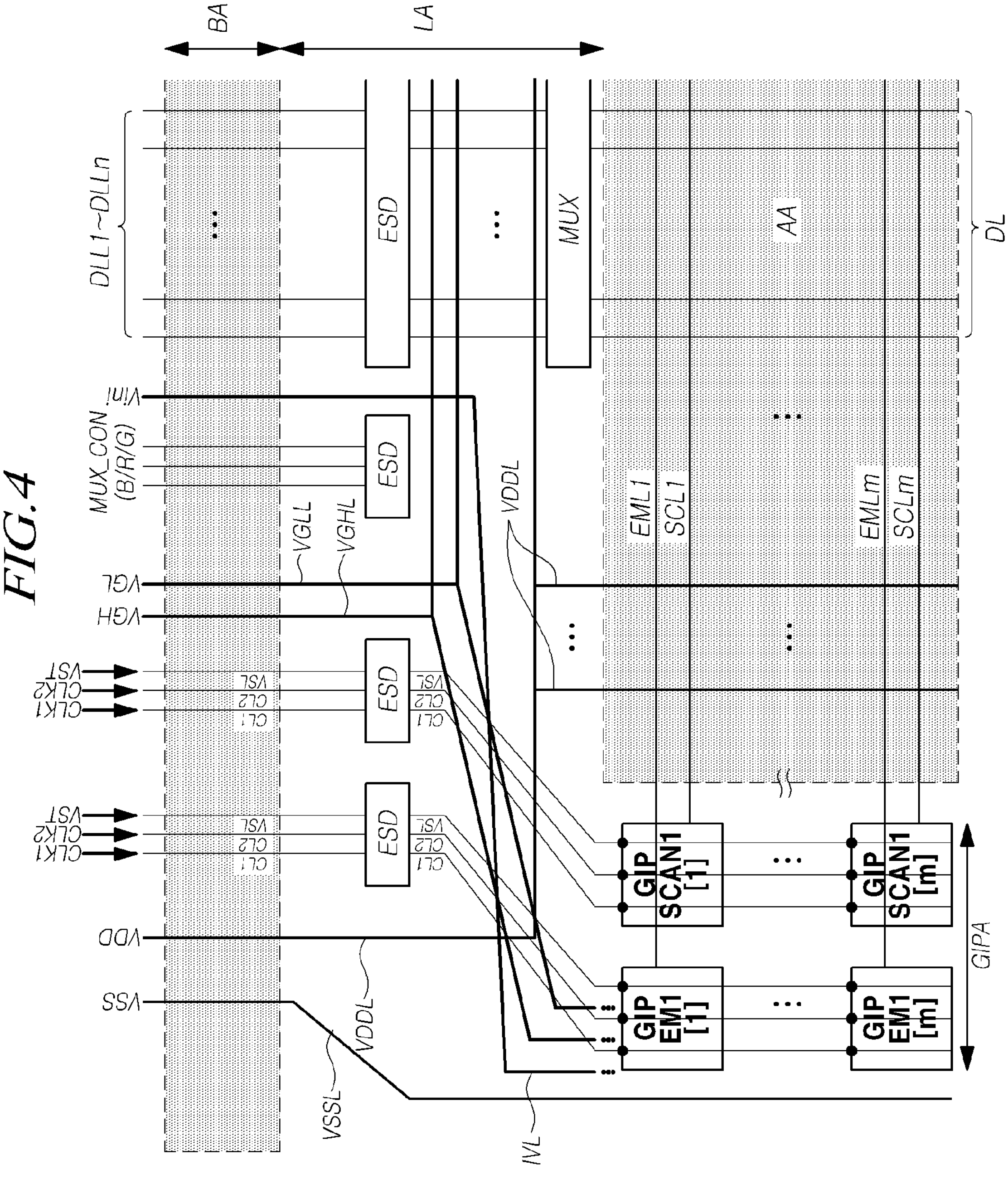
FIG. 4 illustrates bending and link areas of the display panel and bending and wiring structures in an area adjacent to the bending and link areas according to one embodiment of the present disclosure.

FIG. 3 is a plan view schematically illustrating bending and wiring structures of the display panel 110 according to one embodiment of the present disclosure. FIG. 4 illustrates bending and link areas (BA and LA) of the display panel 110 and bending and wiring structures in an area adjacent to the bending and link areas according to one embodiment of the present disclosure.

Referring to FIGS. 3 and 4, all lines, all electrodes, and the like are formed over a substrate SUB. The substrate SUB included in the display device 100 in accordance with embodiments of the present disclosure may be a flexible substrate that can be bent. Herein, the term "bending" may have identical meaning to "folding", "flexible", or the like.

Referring to FIGS. 3 and 4, the substrate SUB may include an active area AA in which images are displayed and a non-active area NA that is an area outside of the active area AA. A plurality of sub-pixels SP may be arranged in the active area AA. The non-active area NA may include a GIP area GIPA in which a gate driving circuit 130 (GIP SCAN1, GIP SCAN2, GIP EM1, GIP EM2) of a GIP type is disposed, a link area LA through which several types of lines pass, a folding area BFA to which a data driving circuit 120 is electrically connected, and the like.

For example, the GIP area GIPA may be located in an area outside of a left edge area and/or a right edge area of the active area AA. The link area LA may be located in an area outside of an upper edge area (or a lower edge area) of the active area AA. The folding area BFA may be more outer edge area in the display panel than the link area LA. A printed circuit board may be electrically connected with the folding area BFA.

As described above, the substrate SUB may include the folding area BFA that can be bent and folded. When the folding area BFA is folded, the substrate SUB may be located on a lower surface or a bottom surface of a part that is not folded. The folding area BFA is a part of the non-active area NA, and may include a driving circuit area DCA with which the data driving circuit 120 is electrically connected or in which the data driving circuit 120 is located and a bending area BA that is located between the driving circuit area DCA and the active area AA and that can be bent.

The link area LA of the non-active area NA may be located between the bending area BA and the active area AA. Several types of signal lines passing through the link area LA may be electrically connected to the data driving circuit 120 or a printed circuit board, which is located in, or connected with, the driving circuit area DCA, after passing through the bending area BA.

Referring to FIGS. 3 and 4, a plurality of data lines DL for delivering data signals VDATA to a plurality of sub-pixels SP, and a plurality of gate lines GL for delivering gate signals to the plurality of sub-pixels may be arranged over the substrate SUB.

For example, the plurality of data lines DL may be arranged in a column direction, and the plurality of gate lines GL may be arranged in a row direction. On the contrary, the plurality of data lines DL may be arranged in the row direction, and the plurality of gate lines GL may be arranged in the column direction. Hereinafter, for convenience of description, discussions are conducted based on a situation in which the plurality of data lines DL is arranged in the column direction and the plurality of gate lines GL is arranged in the row direction.

A plurality of data link lines (DLL1~DLLn) that is resulted from the extending of the plurality of data lines DL or to which the respective data lines DL are connected may be electrically connected to the data driving circuit 120 connected with, or located in, the driving circuit area DCA after passing through the link area LA and the bending area BA.

In case each sub-pixel SP has the 6T1C structure as in FIG. 2, the plurality of gate lines GL arranged in the display panel 110 may include a plurality of first scan lines SCL1 for delivering first scan signals SCAN1 to one or more sub-pixels, a plurality of second scan lines SCL2 for delivering second scan signals SCAN2 to one or more sub-pixels, a plurality of first light emitting control lines EML1 for delivering first light emitting control signals EM1 to one or more sub-pixels, and a plurality of second light emitting control lines EML2 for delivering second light emitting control signals EM2 to one or more sub-pixels.

According to this, the gate driving circuit 130 may include a plurality of first scan drivers GIP SCAN1 outputting respective first scan signals SCAN1 to a plurality of first scan lines SCL1, a plurality of second scan drivers GIP SCAN2 outputting respective second scan signals SCAN2 to a plurality of second scan lines SCL2, a plurality of first light emitting control drivers GIP EM1 outputting respective first light emitting control signals EM1 to a plurality of first light emitting control lines EM1, and a plurality of second light emitting control drivers GIP EM2 outputting respective second light emitting control signals EM2 to a plurality of second light emitting control lines EM2. That is, the plurality of first scan drivers GIP SCAN1 may respectively correspond to the plurality of first scan lines SCL1, the plurality of second scan drivers GIP SCAN2 may respectively correspond to the plurality of second scan lines SCL2, the plurality of first light emitting control drivers GIP EM1 may respectively correspond to the plurality of first light emitting control lines EM1, and the plurality of second light emitting control drivers GIP EM2 may respectively correspond to the plurality of second light emitting control lines EM2, respectively.

The plurality of first scan drivers GIP SCAN1, the plurality of second scan drivers GIP SCAN2, the plurality of first light emitting control drivers GIP EM1, and the plurality of second light emitting control drivers GIP EM2 may be implemented in the GIP type and disposed in the GIP area GIPA in the non-active area NA of the substrate SUB.

All of the plurality of first scan drivers GIP SCAN1, the plurality of second scan drivers GIP SCAN2, the plurality of first light emitting control drivers GIP EM1, and the plurality of second light emitting control drivers GIP EM2 may be disposed in an area of the non-active area NA outside of one side edge area of the active area AA, which is located in the non-active area NA.

In another example, some of the plurality of first scan drivers GIP SCAN1, the plurality of second scan drivers GIP SCAN2, the plurality of first light emitting control drivers GIP EM1, and the plurality of second light emitting control drivers GIP EM2 may be disposed in an area of the non-active area NA outside of a left side edge area (or an area of the non-active area NA outside of an upper side edge area) of the active area AA, and the other thereof may be disposed in an area of the non-active area NA outside of a right side edge area (or an area of the non-active area NA outside of a lower side edge area) of the active area AA.

For example, as shown in FIG. 3, the plurality of first scan drivers GIP SCAN1 and the plurality of first light emitting control drivers GIP EM1 may be disposed in the GIP area GIPA located outside of a left side edge area (or a upper side edge area) of the active area AA, and the plurality of second scan drivers GIP SCAN2 and the plurality of second light emitting control drivers GIP EM2 may be disposed in the GIP area GIPA located outside of a right side edge area (or a lower side edge area) of the active area AA.

Referring to FIG. 4, a first scan drivers GIP SCAN1 [1] disposed closest to the link area LA and the bending area BA among m first scan drivers GIP SCAN1 and a first light emitting control drivers GIP EM1 [1] disposed closest to the link area LA and the bending area BA among m first light emitting control drivers GIP EM1 may be disposed to be adjacent to each other.

Likewise, a first scan drivers GIP SCAN1 [m] disposed farthest from the link area LA and the bending area BA among m first scan drivers GIP SCAN1 and a first light emitting control drivers GIP EM1 [m] disposed farthest from the link area LA and the bending area BA among m first light emitting control drivers GIP EM1 may be disposed to be adjacent to each other.

For convenience of description, FIG. 4 shows structures (GIP EM1, GIP SCAN1) in the GIP area GIPA located outside of the left side edge area of the active area AA. Likewise, such a configuration may be equally applied to structures (GIP EM2, GIP SCAN2) in the GIP area GIPA located outside of a right side edge area of the active area AA.

Gate driving related lines (CL1, CL2, VSL, VGHL, VGLL etc.) for delivering several types of signals (CLK1, CLK2, VST, VGH, VGL etc.) to the gate driving circuit 130 may pass through the bending area BA and the link area LA, and be arranged to extend to an area outside of the left side edge area or the right side edge area of the active area AA.

For example, the gate driving related lines (CL1, CL2, VSL, VGHL, VGLL etc.) may include one or more high-level gate voltage lines VGHL for delivering a high-level gate voltage VGH, one or more low-level gate voltage lines VGLL for delivering a low-level gate voltage VGL, a plurality of clock lines (CL1, CL2 etc.) for delivering a plurality of clock signals (CLK1, CLK2 etc.), one or more start lines VSL for delivering one or more start signals VST, or the like.

According to the sub-pixel structure of FIG. 2, in order to drive one or more sub-pixel(s) SP, a plurality of driving voltage lines VDDL for delivering a driving voltage VDD to one or more sub-pixel(s) SP, a plurality of initialization voltage lines IVL for delivering an initialization voltage Vini to one or more sub-pixel(s) SP, and one or more low-level voltage lines VSSL for applying a low-level voltage VSS to a second electrode CE of a light emitting element ED in each sub-pixel SP may be further disposed over the substrate SUB.

For example, the plurality of driving voltage lines VDDL and the plurality of initialization voltage lines IVL may be arranged in the column direction.

For efficiency delivering a driving voltage VDD to the plurality of driving voltage lines VDDL, a driving voltage pattern VDDP integrally formed with, or electrically connected to, the plurality of driving voltage lines VDDL may be disposed in the link area LA.

The plurality of driving voltage lines VDDL may pass the bending area BA through the driving voltage pattern VDDP and be electrically connected to the data driving circuit 120 or a printed circuit board disposed in, or connected with, the driving circuit area DCA.

The plurality of initialization voltage lines IVL may be arranged in the row direction or in the column direction in the active area AA. In order efficiently to deliver an initialization voltage Vini, the plurality of initialization voltage lines IVL may be located in the non-active area NA and arranged to surround all or at least a part of one or more edge areas of the active area AA.

The plurality of initialization voltage lines IVL or at least one line to which the plurality of initialization voltage lines IVL are bound may pass the bending area BA and be electrically connected to the data driving circuit 120 or a printed circuit board disposed in, or connected with, the driving circuit area DCA.

In order efficiently to deliver a low-level voltage VSS, one or more low-level voltage lines VSSL may be located in the non-active area NA and arranged to surround all or at least a part of an edge area of the active area AA. Further, one or more low-level voltage lines VSSL may pass the bending area BA and be electrically connected to the data driving circuit 120 or a printed circuit board disposed in, or connected with, the driving circuit area DCA.

The display device 100 in accordance with one embodiment of the present disclosure may further include an electrostatic discharge circuit ESD for electrostatic discharge in various signal lines. The electrostatic discharge circuit ESD may be disposed in the link area LA.

the display device 100 in accordance with one embodiment of the present disclosure may further include a data distribution circuit MUX disposed in the link area LA of the non-active area NA.

Taking account of one data link line of the plurality of data link lines (DLL1~DLLn), the data distribution circuit MUX can electrically connect one data line DL selected from two or more data lines DL arranged in the active area AA to one data link line.

According to this, data signals VDATA outputted from the data driving circuit 130 are supplied to a plurality of data link lines (DLL1~DLLn) arranged in the link area LA of the non-active area NA. Further, as the data distribution circuit MUX selects some (e.g., odd-numbered data line groups) of a plurality of data lines DL arranged in the active area AA and electrically connects data lines DL (n data lines) included in the selected data line group(s) to a plurality of data link lines (DLL1~DLLn), thus, data signals VDATA can be outputted to the some data line group(s) (e.g., odd-numbered data line groups) selected from the plurality of data lines DL.

Thereafter, other data signals VDATA outputted from the data driving circuit 130 are supplied to a plurality of data link lines (DLL1~DLLn) arranged in the link area LA of the non-active area NA. Further, as the data distribution circuit MUX selects the other (e.g., even-numbered data line groups) of the plurality of data lines DL arranged in the active area AA and electrically connects data lines DL (n data lines) included in the selected data line group(s) to the plurality of data link lines (DLL1~DLLn), thus, data signals VDATA can be outputted to the other data line group(s) (e.g., even-numbered data line groups) selected from the plurality of data lines DL.

In this case, some data line group(s) (e.g., odd-numbered data line groups) and the other data line group(s) (e.g., even-numbered data line groups) may be driven in time-division manner during one horizontal time (1H).

The data distribution circuit MUX described above is referred to as a de-multiplexer circuit, and in some instances, referred to as a multiplexing circuit as well.

A signal line for delivering a control signal (MUX_CON, B/R/G) for the operation of the data distribution circuit MUX may be disposed in the link area LA after passing through the bending area BA.

In the display panel 110 as described above by allowing a portion (the folding area BFA) of the substrate SUB formed of a flexible material, in which the data driving circuit 120 is located or with which the data driving circuit 120 is connected to be bent, a corresponding part of the substrate SUB can be folded backwards. Such a folded portion (the folding area BFA) is a portion on which images cannot be displayed, and this portion cannot be seen from the front of the display device 100. Accordingly, by utilizing the bending structure and line arrangement structure as in FIGS. 3 and 4, it is possible remarkably to reduce a bezel size of the display device 100 and provide a design feeling high aesthetic satisfaction through such a narrow bezel design.

Figure 5:
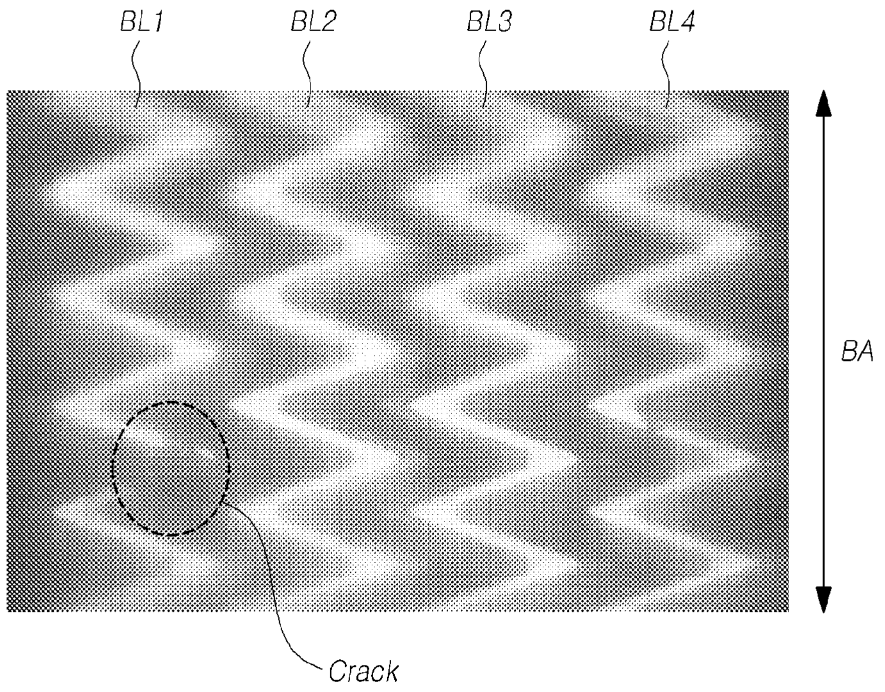
FIG. 5 illustrates an abnormality in signal lines arranged in the bending area of the display panel according to one embodiment of the present disclosure.

FIG. 5 illustrates an abnormality in signal lines (BL1~BL4) arranged in the bending area BA of the display panel 110 according to embodiments of the present disclosure.

Referring to FIG. 5, as described above, various signal lines (BL1~BL4 etc.) may be arranged in the bending area BA. The signal lines (BL1~BL4 etc.) passing through the bending area BA may include a plurality of data link lines (DLL1~DLLn), a high-level gate voltage line VGHL, a low-level voltage line VGLL, a plurality of clock lines (CL1, CL2), a start line VSL, a driving voltage line VDDL, a low-level voltage line VSSL, an initialization voltage line IVL, and the like.

Referring to FIG. 5, the signal lines (BL1~BL4 etc.) passing through the bending area BA may be formed in a zigzag pattern to reduce cracking. Nevertheless, when the bending area is bent, one or more of the signal lines (BL1~BL4 etc.) passing through the bending area BA may crack (in an electrical open state) or be short-circuited with an adjacent signal line.

In such a situation, since a signal cannot be accurately delivered through a signal line (the BL1 in FIG. 5) that has cracked (in an electrical open state) or been short-circuited, thus, images may not be properly displayed due to a problem in driving display device, resulting in image quality being significantly degraded.

To address such issues, hereinafter, in a situation where a problem (e.g., a crack, a short circuit etc.) occurs in one or more signal lines passing through the bending area BA, methods and apparatuses will be discussed for detecting such a problem.

In this case, for convenience of description and ease of the understanding, discussions will be conducted based on clock lines (CL1, CL2) and a start line VSL of gate driving related lines among several types of signal lines passing through the bending area BA.

Figure 6:
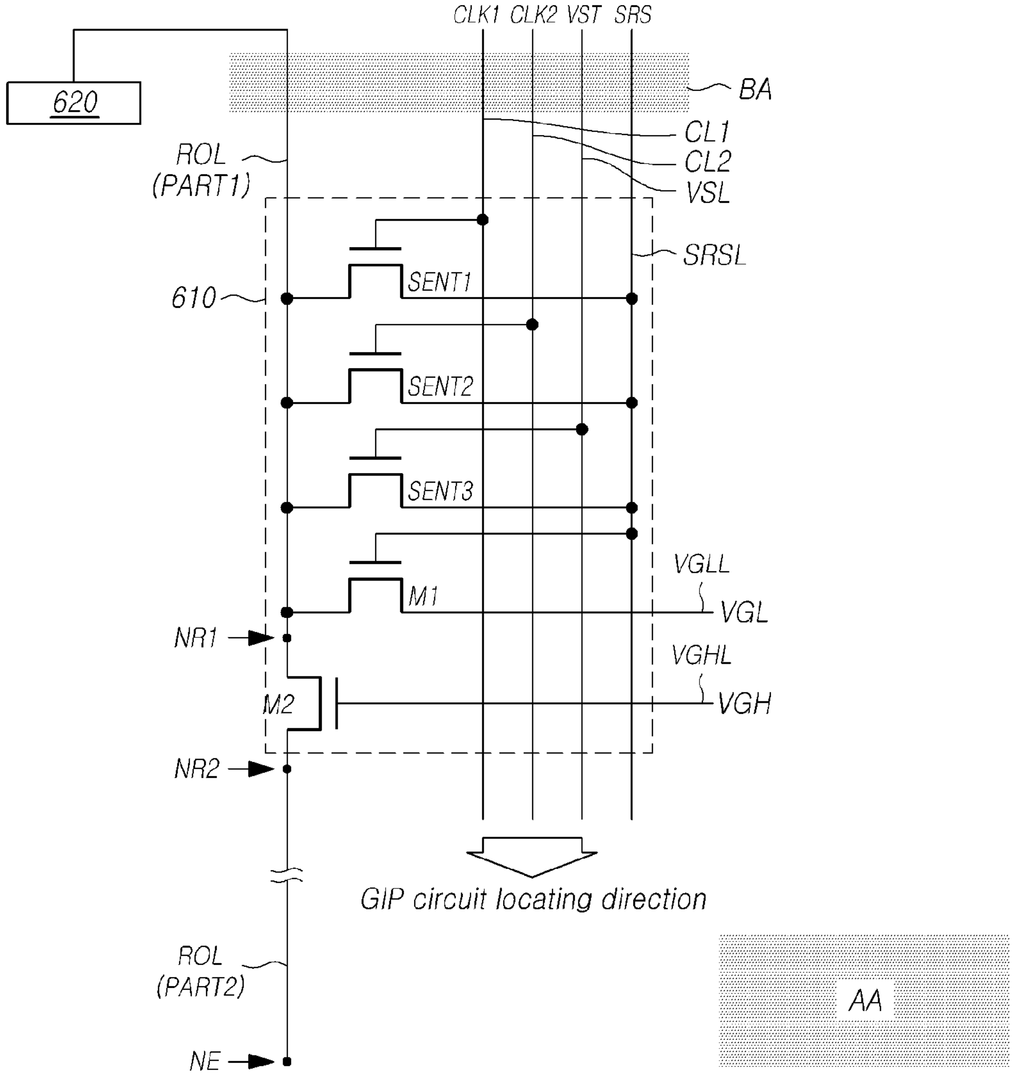
FIG. 6 illustrates a sensor circuit and a determining circuit for sensing the presence or absence of an abnormality in signal lines arranged in the bending area of the display panel according to one embodiment of the present disclosure.
Figure 7:
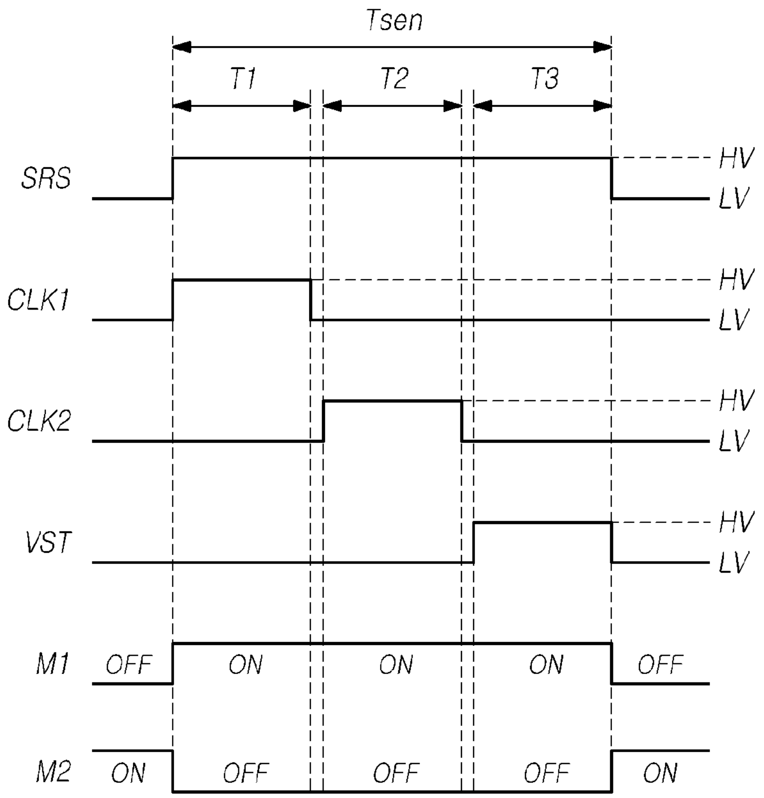
FIG. 7 is a driving timing diagram illustrating sensing operations of the sensor circuit according to one embodiment of the present disclosure.
Figure 8:
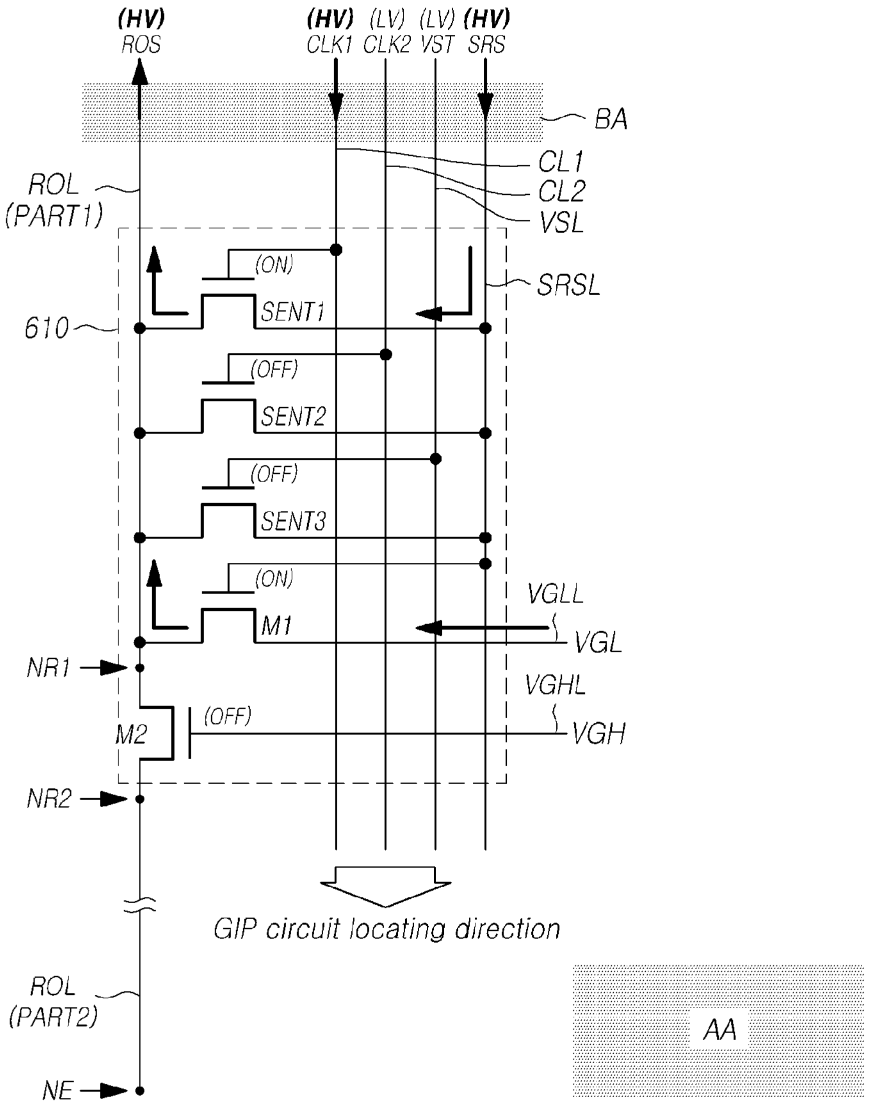
FIG. 8 illustrates sensing operations of the sensor circuit when a first signal line is in a normal state while the sensing operations of the sensor circuit are performed according to one embodiment of the present disclosure.
Figure 9:
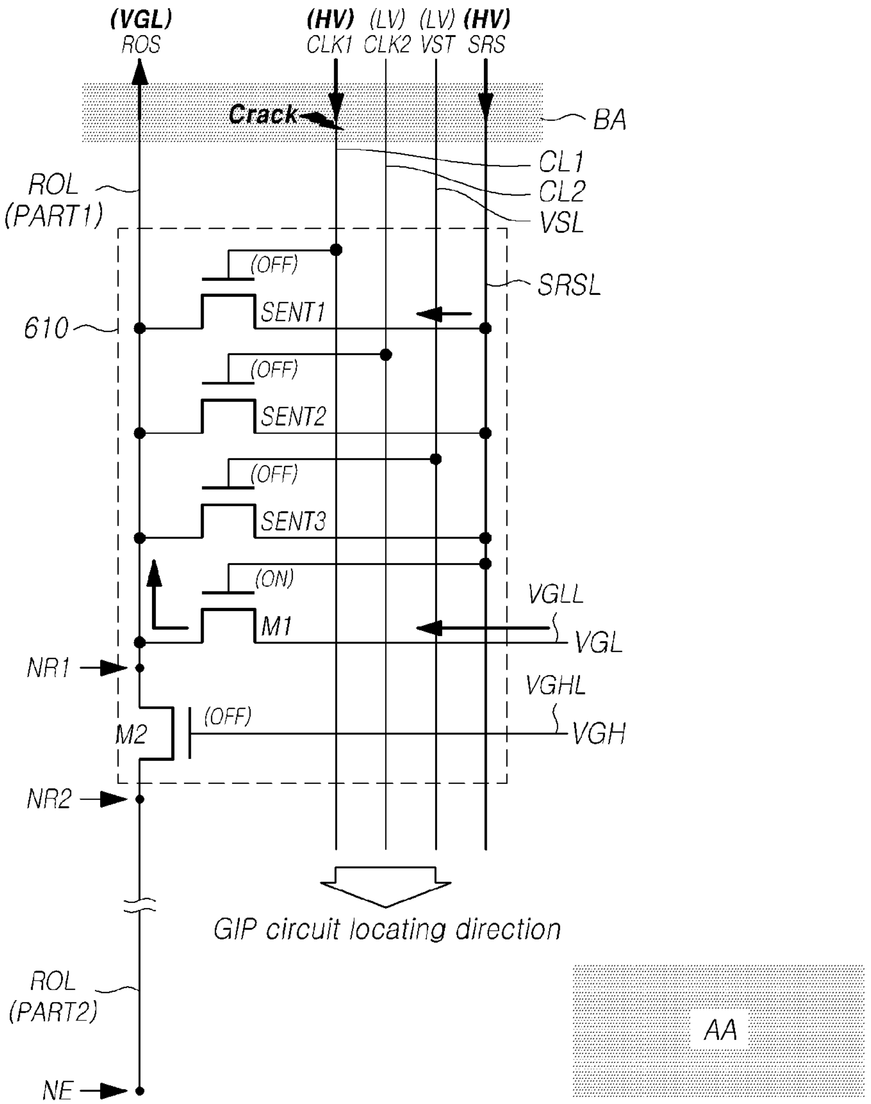
FIG. 9 illustrates sensing operations of the sensor circuit when the first signal line has a crack while the sensing operations of the sensor circuit are performed according to one embodiment of the present disclosure.
Figure 10:
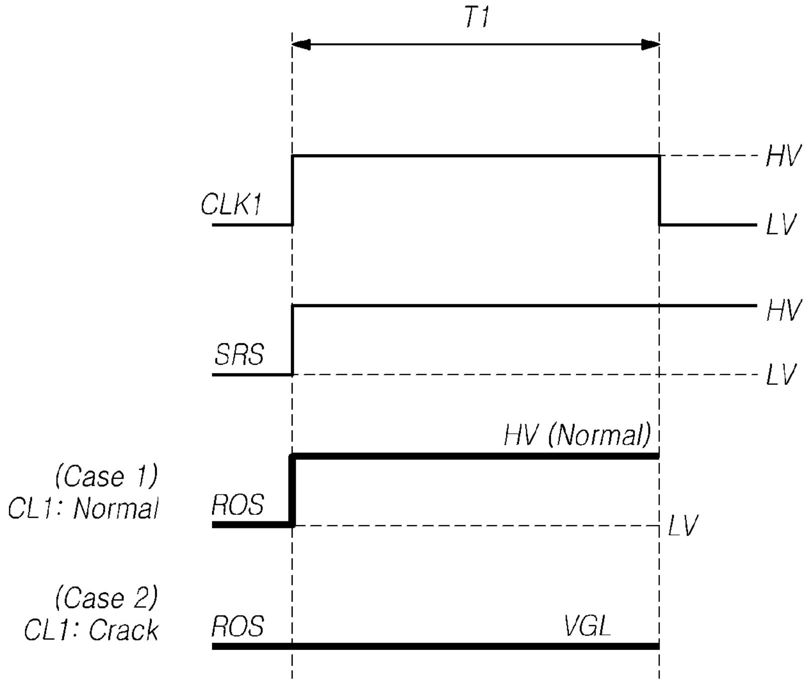
FIG. 10 illustrates read-out signals resulted from the sensing of the determining circuit based on the sensor circuit in a situation where a first signal line is in a normal state and in a situation where a first signal line has a crack while the sensing operations of the sensor circuit are performed according to one embodiment of the present disclosure.

FIG. 6 illustrates a sensor circuit 610 and a determining circuit 620 for sensing the presence or absence of an abnormality in signal lines arranged in the bending area BA of the display panel 110 according to one embodiment of the present disclosure. FIG. 7 is a driving timing diagram illustrating sensing operations of the sensor circuit 610 according to one embodiment of the present disclosure. FIG. 8 illustrates sensing operations of the sensor circuit 610 when a first signal line CL1 is in a normal state while the sensing operations of the sensor circuit 610 are performed according to one embodiment of the present disclosure. FIG. 9 illustrates sensing operations of the sensor circuit 610 when the first signal line CL1 has a crack while the sensing operations of the sensor circuit 610 are performed according to one embodiment of the present disclosure. Further, FIG. 10 illustrates read-out signals SEN resulted from the sensing of the determining circuit 620 based on the sensor circuit 610 in a situation where the first signal line CL1 is in a normal state and in a situation where it has a crack while the sensing operations of the sensor circuit 610 are performed according to one embodiment of the present disclosure.

In FIGS. 6 to 10, for convenience of description and ease of the understanding, discussions are conducted based on 3 signal lines (CL1, CL2, VSL) passing through the bending area BA. The sensor circuit 610 shown in FIG. 6 is used for sensing the presence or absence of an abnormality in the 3 signal lines (CL1, CL2, VSL) passing through the bending area BA. Hereinafter, discussions will be conducted based on the first signal line CL1 of the 3 signal lines (CL1, CL2, VSL). Technical specification related to the first signal line CL1 may be equally applied to the other signal lines.

Referring to FIG. 6, the display device 100 in accordance with an embodiment of the present disclosure may include the sensor circuit 610 and the determining circuit 620. The sensor circuit 610 and the determining circuit 620 may be connected to each other through a read-out line ROL.

Referring to FIG. 6, the sensor circuit 610 is disposed in the link area LA, which is located in the non-active area NA, between the bending area BA and the active area AA, and can sense the presence or absence of an abnormality in the first signal line CL1 of the bending area BA.

Referring to FIG. 6, the sensor circuit 610 may include a sensing reference signal line SRSL for delivering a sensing reference signal SRS, a read-out line ROL for delivering a read-out signal ROS to the determining circuit 620, a first sensing transistor SENT1 including a gate node electrically connected to the first signal line CL1, a drain node or a source node connected to the sensing reference signal line SRSL, and the source node or the drain node connected to the read-out line, and the like.

The determining circuit 620 may be electrically connected to the read-out line ROL, receive a read-out signal ROS through the read-out line ROL, and determine the presence or absence of an abnormality in the first signal line CL1 based on the read-out signal ROS.

When it is determined that the first signal line CL1 is in an abnormal state, the determining circuit 620 may control identification information or location information of the first signal line CL1 or information resulted from the determination to be stored in a memory or displayed on a screen.

To do this, the display device 100 may include a memory in which identification information, location information of the first signal line, and/or the like on signal lines arranged in the display panel 110 are stored in advance.

Referring to FIG. 7, the sensing reference signal SRS has a high-level voltage HV during an entire sensing period Tsen for the bending area BA. The sensing reference signal SRS has a low-level voltage LV during a period (e.g., a display driving period) not included in the entire sensing period Tsen for the bending area BA.

During the entire sensing period Tsen for the bending area BA, high-level voltages HV are sequentially supplied to the signal lines (CL1, CL2, VSL) in order to check the presence or absence of abnormalities therein. In other words, during the entire sensing period Tsen for the bending area BA, sensing periods (T1, T2, T3) are sequentially assigned for respective the signal lines (CL1, CL2, VSL) to check the presence or absence of abnormalities. FIG. 7 shows that blank periods are present between sensing periods (T1, T2, T3). However, in the case of ideal signals, such blank periods can be omitted or removed.

During a first sensing period T1 for sensing the presence or absence of an abnormality in the first signal line CL1, a high-level voltage HV is applied to the first signal line CL1, and a low-level voltage LV is applied to the remaining signal lines (CL2, VSL).

During a second sensing period T2 for sensing the presence or absence of an abnormality in the second signal line CL2, a high-level voltage HV is applied to the second signal line CL2, and a low-level voltage LV is applied to the remaining signal lines (CL1, VSL).

During a third sensing period T3 for sensing the presence or absence of an abnormality in the third signal line VSL, a high-level voltage HV is applied to the third signal line VSL, and a low-level voltage LV is applied to the remaining signal lines (CL1, CL2).

Referring to FIG. 7, during the first sensing period T1 for sensing the presence or absence of an abnormality in the first signal line CL1 within the entire sensing period Tsen for the bending area BA, a first signal CLK1 with a turn-on level of voltage for turning on the first sensing transistor SENT1 may be applied to the first signal line CL1, and a sensing reference signal SRS with a high-level voltage HV may be applied to the sensing reference signal line SRSL.

Here, since it is assumed that the first sensing transistor SENT1 is an n-type transistor, the turn-on level of voltage of the first sensing transistor SENT1 is a high-level voltage HV. If the first sensing transistor SENT1 is a p-type transistor, the turn-on level of voltage of the first sensing transistor SENT1 may be a low-level voltage LV.

Referring to FIG. 6, the sensor circuit 610 may include a second sensing transistor SENT2 that includes a gate node connected to the second signal line CL2, a drain node or a source node connected to the sensing reference signal line SRSL, and the source node or the drain node connected to the read-out line ROL.

Further, the sensor circuit 610 may include a third sensing transistor SENT3 that includes a gate node connected to the start line VSL, a drain node or a source node connected to the sensing reference signal line SRSL, and the source node or the drain node connected to the read-out line ROL.

the respective drain nodes or source nodes of the first to third transistors (SENT1, SENT2, SENT3) may be commonly connected to the sensing reference signal line SRSL. Further, the source nodes or drain nodes of the respective first to third transistors (SENT1, SENT2, SENT3) may be commonly connected to the read-out line ROL. Further, respective gate nodes of the first to third transistors (SENT1, SENT2, SENT3) may be connected to the signal lines (CL1, CL2, VSL) required to check the presence or absence of abnormalities.

For example, the first signal line CL1 may be a first clock line for delivering a first clock signal CLK1 to the gate driving circuit 130, the second signal line CL2 may be a second clock line for delivering a second clock signal CLK2 to the gate driving circuit 130, and the third signal line VSL may be a start line for delivering a start signal VST to the gate driving circuit 130.

As described above, the first sensing period T1 for sensing the presence or absence of an abnormality in the first signal line CL1, the second sensing period T2 for sensing the presence or absence of an abnormality in the second signal line CL2, and the third sensing period T3 for sensing the presence or absence of an abnormality in the third signal line VSL may be assigned at different timing from one another, and may not overlap with one another.

During the first sensing period T1, a first signal CLK1 with a turn-on level of voltage for turning on the first sensing transistor SENT1 may be applied to the first signal line CL1, a second signal CLK2 with a turn-off level of voltage for turning off the second sensing transistor SENT2 may be applied to the second signal line CL2, a third signal VST with a turn-off level of voltage for turning off the third sensing transistor SENT3 may be applied to the third signal line VSL, and a sensing reference signal SRS with a high-level voltage HV may be applied to the sensing reference signal line SRSL.

During the second sensing period T2, a first signal CLK1 with a turn-off level of voltage of the first sensing transistor SENT1 may be applied to the first signal line CL1, a second signal CLK2 with a turn-on level of voltage of the second sensing transistor SENT2 may be applied to the second signal line CL2, a third signal VST with the turn-off level of voltage of the third sensing transistor SENT3 may be applied to the third signal line VSL, and the sensing reference signal SRS with the high-level voltage HV may be applied to the sensing reference signal line SRSL.

During the third sensing period T3, the first signal CLK1 with the turn-off level of voltage of the first sensing transistor SENT1 may be applied to the first signal line CL1, the second signal CLK2 with the turn-off level of voltage of the second sensing transistor SENT2 may be applied to the second signal line CL2, a third signal VST with a turn-on level of voltage of the third sensing transistor SENT3 may be applied to the third signal line VSL, and the sensing reference signal SRS with the high-level voltage HV may be applied to the sensing reference signal line SRSL.

FIGS. 8 and 9 illustrate drivings during the first sensing period T1 for sensing the presence or absence of an abnormality in the first signal line CL1.

FIG. 8 illustrates a driving where the first signal line CL1 is in a normal state (Case 1). FIG. 9 illustrates a driving where the first signal line CL1 is in an abnormal state (e.g., cracks, etc.) (Case 2). FIG. 10 is a timing diagram illustrating read-out signals ROS detected by the determining circuit 620 based on the sensor circuit 610 for the two cases (Case 1 and Case 2).

Referring to FIGS. 8 to 10, during the first sensing period T1 for sensing the presence or absence of an abnormality in the first signal line CL1, when a first signal CLK1 with a turn-on level of voltage of the first sensing transistor SENT1 is applied to the first signal line CL1, the first sensing transistor SENT1 may be turned on or turned off depending on whether a crack is present in the first signal line CL1.

Referring to FIG. 8, when the first signal line CL1 is in the normal state (Case 1), the first signal CLK1 with the turn-on level of voltage is normally applied to the gate node of the first sensing transistor SENT1 through the first signal line CL1. According to this, the first sensing transistor SENT1 is turned on. According to this, the first sensing transistor SENT1 can transfer a sensing reference signal SRS with a high-level voltage HV to the read-out line ROL.

Referring to FIG. 10, the determining circuit 620 can read the sensing reference signal SRS with the high-level voltage HV through the read-out line ROL. When a read-out signal ROS corresponds to the sensing reference signal SRS, the determining circuit 620 can determine that the first signal line CL1 is in the normal state. In this case, the sensing reference signal SRS and the read-out signal ROS have high-level voltages HV.

Referring to FIG. 9, when the first signal line CL1 has a crack in the bending area BA (Case 2), even though the first signal CLK1 with the turn-on level of voltage is applied to the first signal line CL1, due to the crack in the first signal CLK1, the first signal CLK1 with the turn-on level of voltage cannot be normally applied to the gate node of the first sensing transistor SENT1. As a result, the first sensing transistor SENT1 is in the turn-off state. Accordingly, the first sensing transistor SENT1 may not transfer the sensing reference signal SRS with the high-level voltage HV to the read-out line ROL.

Referring to FIG. 10, during a first sensing period T1, the determining circuit 620 cannot read the sensing reference signal SRS with the high-level voltage HV through the read-out line ROL. When the read-out signal ROS does not correspond to the sensing reference signal SRS, the determining circuit 620 can determine that the first signal line CL1 is in the abnormal state (e.g., a crack, a short circuit, etc.). In this case, the sensing reference signal SRS may have a high-level voltage HV, and the read-out signal ROS may be in a non-high-level state, for example, have a low-level voltage LV.

The sensor circuit 610 may further include a first control transistor M1 controlled by the sensing reference signal SRS and connected with a low-level gate voltage line VGLL and the read-out line ROL, a second control transistor M2, turn-on and turn-off of which are controlled by a signal delivered through a high-level gate voltage line VGHL, and the like.

The read-out line ROL may be arranged to extend to an area (e.g., a GIP area GIPA) outside of a side edge area of the active area AA. The read-out line ROL may include a first portion (PART1) located in the link area LA and a second portion (PART2) located in an area outside of a side edge area of the active area AA. The second control transistor M2 may be connected in series to the read-out line ROL, and be disposed to be adjacent to a side edge area of the active area AA and in the link area LA. Accordingly, in the read-out line ROL, the first portion (PART1) located in the link area LA and the second portion (PART2) located in the area outside of the side edge area of the active area AA may be connected or disconnected to each other depending on turn-on or turn-off of the second control transistor M2.

In the read-out line ROL, an end NR1 of the first portion (PART1) located in the link area LA may be connected to the drain node or the source node of the second control transistor M2. Further, in the read-out line ROL, one end NR2 of the second portion (PART2) located in the area outside of the side edge area of the active area AA may be connected to the source node or drain node of the second control transistor M2 not connected with the end NR1 of the read-out line ROL.

The gate driving circuit 130 is disposed over the substrate SUB and may include a plurality of gate drivers (GIP SCAN1, GIP SCAN2, GIP EM1, GIP EM2) that are formed in the gate in panel (GIP) type.

In the read-out line ROL, the other end NE, which is not connected to the second control transistor M2, of the second portion (PART2) located in the area (the GIP area GIPA) outside of the side edge area of the active area AA may be electrically connected to an output terminal of a last gate driver (GIP SCAN1 [m], GIP SCAN2 [m], GIP EM1 [m], GIP EM2 [m]) disposed farthest from the bending area BA among a plurality of gate drivers (GIP SCAN1, GIP SCAN2, GIP EM1, GIP EM2). At the display driving time, as the second control transistor M2 is turned on, and thereby, an output value output from a last gate driver is provided to the determining circuit 620 through the read-out line ROL, a defect of the gate driver can be identified by determining the presence or absence of an abnormality in the output value of the last gate driver. Since the gate driver is operated by receiving an output signal of a previous gate driver, the presence or absence of an abnormality in gate drivers can be identified by identifying an output signal of the last gate driver.

Taking account of the first and second control transistors (M1, M2), during the first sensing period T1 for sensing the presence or absence of an abnormality in the first signal line CL1, the first control transistor M1 can be turned on by the sensing reference signal SRS with the high-level voltage HV and transfer a low-level gate voltage VGL delivered through the low-level gate voltage line VGLL to the read-out line ROL.

As the first sensing period T1 for sensing the presence or absence of an abnormality in the first signal line CL1 is initiated, a high-level gate voltage VGH applied to the high-level gate voltage line VGHL is varied from a high-level voltage HV to a low-level voltage LV, and thus, the second control transistor M2 can be turned off.

As such, during the entire sensing period Tsen including the first sensing period T1, the second control transistor M2 is in the turn-off state. Accordingly, in the read-out line ROL, the first portion (PART1) located in the link area LA and the second portion (PART2) located in the area outside of the side edge area of the active area AA are electrically disconnected to each other. As a result, in the read-out line ROL, the second portion (PART2) located in the area outside of the side edge area of the active area AA does not affect the sensing.

Further, during the entire sensing period Tsen including the first sensing period T1, the first control transistor M1 is in the turn-on state. Accordingly, a low-level gate voltage VGL is always applied to the read-out line ROL through the first control transistor M1. Thus, it is possible to prevent the read-out line ROL from being electrically floated, and enable the sensor circuit 610 to be operated stably. However, as the first control transistor M1 is continuously turned on during sensing period Tsen, a load may increase when sensing a sensing reference signal SRS; therefore, the sensor circuit 610 may omit the first control transistor M1.

Taking account of the first and second control transistors (M1, M2), referring to FIG. 10, when a read-out signal ROS corresponds to the sensing reference signal SRS with the high-level voltage HV, the determining circuit 620 determines that the first signal line CL1 is in the normal state.

Further, when the read-out signal ROS corresponds to the low-level gate voltage VGL, the determining circuit 620 determines that a crack is present in the first signal line CL1. In another situation, when the first signal line CL1 is shorted, a load in the first signal line CL1 increases; therefore, the low-level gate voltage VGL rises. Taking these operations into account, the determining circuit 620 may identify that an abnormality in the first signal line CL1 is a crack, not a short circuit.

In case the sensor circuit 610 and the determining circuit 620 are employed, it is possible to identify that a crack or a short in the first signal line CL1 is present in the bending area BA, that is, a location of the crack. This is because a location at which the sensor circuit 610 is disposed is a point immediately adjacent to the bending area BA.

Since the signals applied to gate nodes of sensing transistors (SENT1, SENT2, SENT3) are inputted from a point adjacent to the bending area BA, and the sensing reference signal SRS applied to drain nodes or source nodes of the sensing transistors (SENT1, SENT2, SENT3) is also inputted from a point adjacent to the bending area BA, it is therefore possible to identify whether an abnormality is present in a signal line located in the bending area BA.

Figure 11:
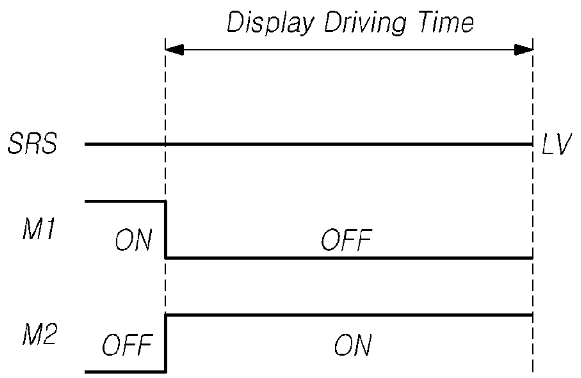
FIG. 11 illustrates states of a sensing reference signal, a first control transistor, and a second control transistor, which are included in the sensor circuit while the display device is driven in a display mode according to one embodiment of the present disclosure.
Figure 12:
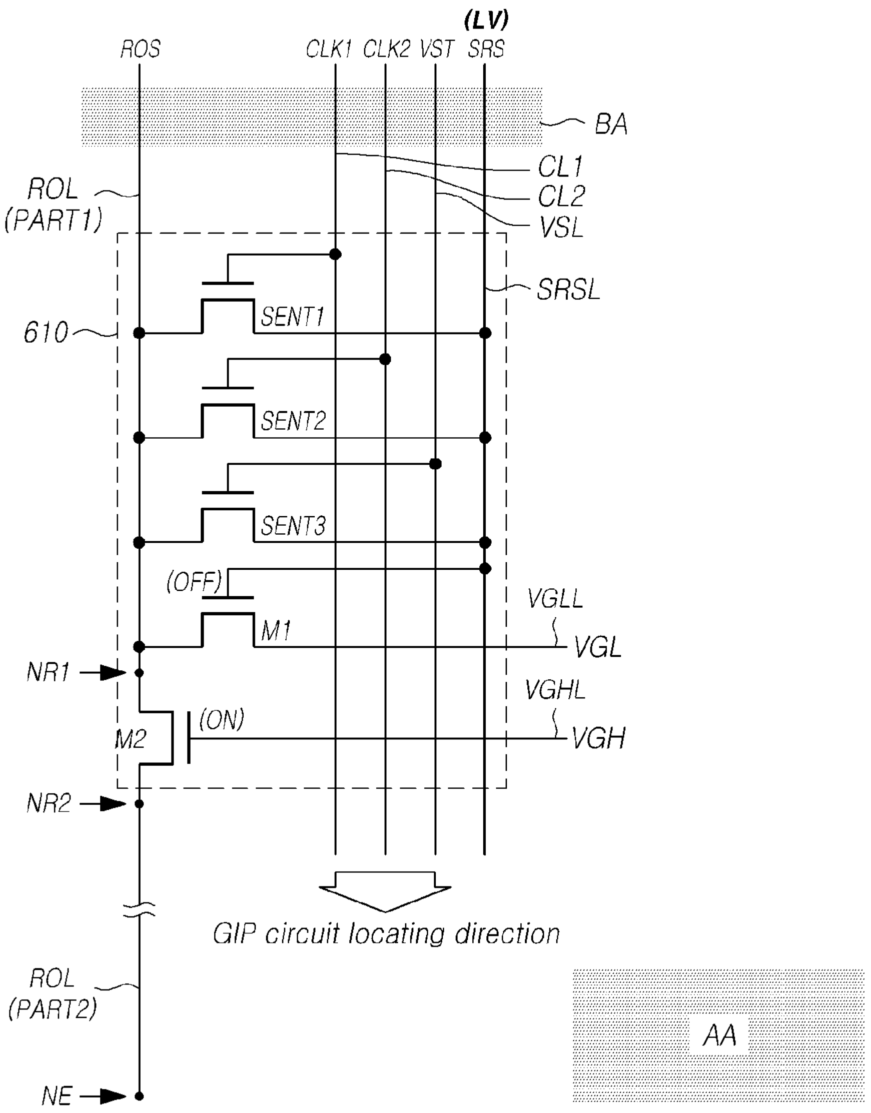
FIG. 12 illustrates states of the sensor circuit while the display device is driven in the display mode according to one embodiment of the present disclosure.

FIG. 11 illustrates states of a sensing reference signal SRS, a first control transistor M1, and a second control transistor M2, which are included in the sensor circuit 610 while the display device 100 is driven in a display mode according to one embodiment of the present disclosure. FIG. 12 illustrates states of the sensor circuit 610 while the display device 100 is driven in the display mode according to one embodiment of the present disclosure.

Referring to FIGS. 11 and 12, the first control transistor M1 may be in the turn-on state and the second control transistor M2 may be in the turn-off state during a display driving period for displaying images. A portion (PART1) located in the link area and a portion (PART2) located outside of a side edge area of the active area AA of the read-out line ROL are electrically connected through the second transistor M2 that is turned-on.

Further, at the display driving time for displaying images, a sensing reference signal SRS with a low-level voltage may be applied to the sensing reference signal line SRSL.

In case the first signal line CL1 is a clock line for delivering a clock signal to the gate driving circuit 130, the first sensing transistor SENT1 can be turned on at a predetermined time (e.g., a scanning timing, at this time, the clock signal is a high-level voltage) within one frame time; however, since the sensing reference signal SRS has the low-level voltage LV at the display driving time, the low-level voltage LV is continually provided to the read-out line ROL.

Figure 13:
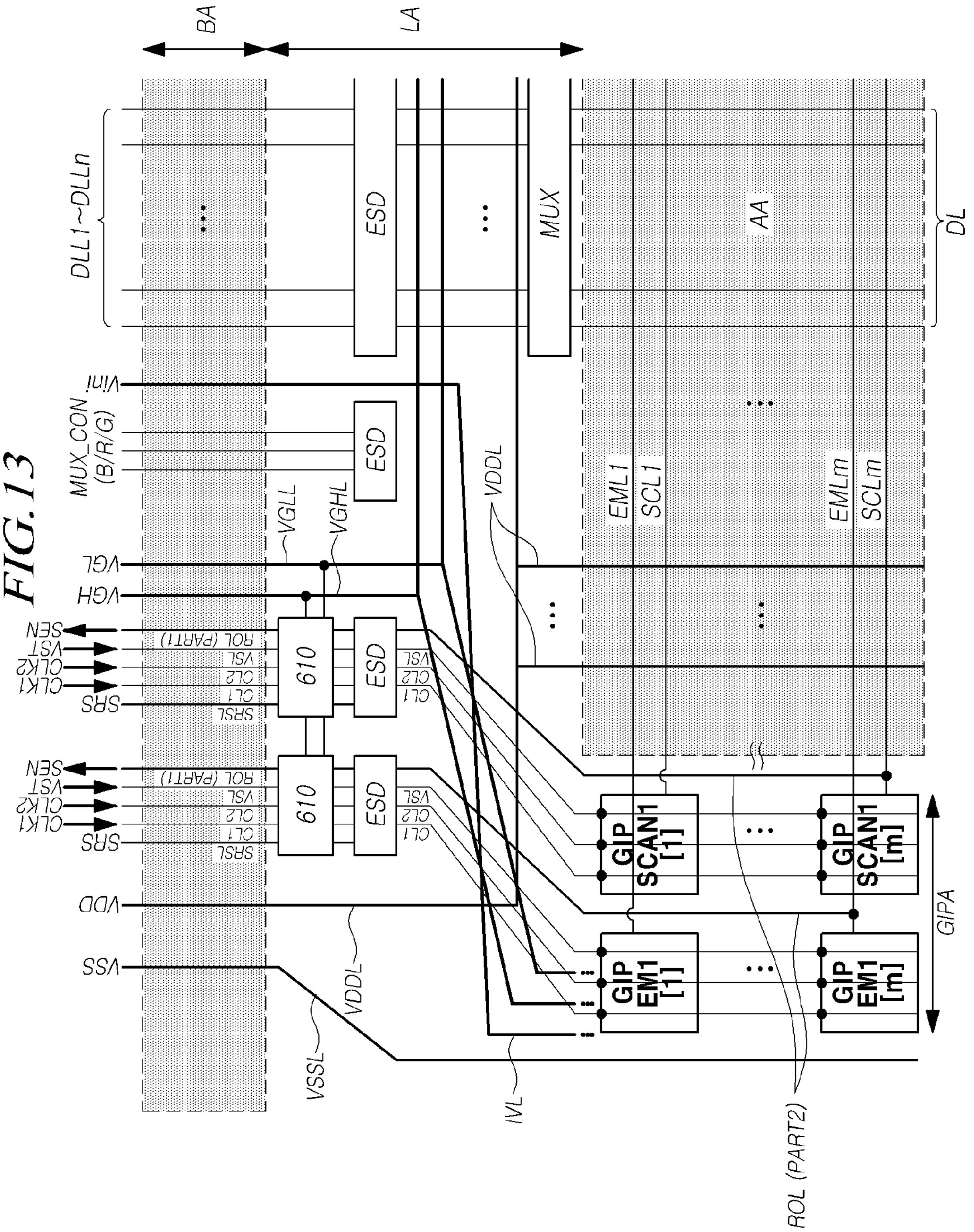
FIG. 13 is a plan view illustrating a portion in which the sensor circuit is disposed in the display device according to one embodiment of the present disclosure.

FIG. 13 is a plan view illustrating a portion in which the sensor circuit 610 is disposed in the display device 100 according to one embodiment of the present disclosure. Hereinafter, discussions for configurations equal to the configuration in FIG. 4 will be briefly conducted or not be repeatedly given.

Referring to FIG. 13, one or more sensor circuits (610) and one or more electrostatic discharge circuits ESD may be disposed in the link area LA. The first signal line CL1, the read-out line ROL and the sensing reference signal line SRSL may be connected to the electrostatic discharge circuits ESD. Through this, the gate driving circuit 130, the determining circuit 620, the sub-pixel SP, or the like, which is connected to the lines, can be protected by preventing static electricity that may occur during a process, a spark voltage that may be temporarily unexpectedly generated, or the like.

Referring to FIG. 13, the sensing reference signal line SRSL may be connected only to the sensor circuit 610 and the electrostatic discharge circuit ESD, and may not be connected to the GIP area GIPA.

Referring to FIG. 13, first to third signal lines (CL1, CL2, VSL) for delivering first to third signals (CLK1, CLK2, VST) to all or one or more of m first scan drivers (GIP SCAN1 [1]~GIP SCAN1 [m]) and a read-out line ROL are arranged up to the GIP area GIPA after passing through the bending area BA and the link area LA.

A sensor circuit 610 for sensing the presence or absence of abnormalities in the first to third signal lines (CL1, CL2, VSL) for delivering first to third signals (CLK1, CLK2, VST) to all or one or more of the m first scan drivers (GIP SCAN1 [1]~GIP SCAN1 [m]) may be disposed in the link area LA. The sensor circuit 610 may be connected to a high-level gate voltage line VGHL and a low-level gate voltage line VGLL.

The first to third signal lines (CL1, CL2, VSL) for delivering first to third signals (CLK1, CLK2, VST) to all or one or more of the m first scan drivers (GIP SCAN1 [1]~GIP SCAN1 [m]) are connected to all or one or more of the m first scan drivers (GIP SCAN1 [1]µGIP SCAN1 [m]) arranged in the GIP area GIPA after passing through the sensor circuit 610 and then passing through the electrostatic discharge circuit ESD.

The read-out line ROL may be connected to an output terminal of a last scan driver (GIP SCAN1 [m]) of the m first scan drivers (GIP SCAN1 [1], . . . , GIP SCAN1 [m]) arranged in the GIP area after passing through the sensor circuit 610 and then passing through the electrostatic discharge circuit ESD. Through this, the sensor circuit 610 can output, as a read-out signal ROS, a signal at the output terminal of the last scan driver (GIP SCAN1 [m]). The determining circuit 620 can check whether first scan signals SCAN1 in the m first scan drivers (GIP SCAN1 [1], . . . , GIP SCAN1 [m]) are normally outputted based on the read-out signal ROS that is a sensing signal SEN.

Referring to FIG. 13, first to third signal lines (CL1, CL2, VSL) for delivering first to third signals (CLK1, CLK2, VST) to all or one or more of m first light emitting control drivers (GIP EM1 [1], . . . , GIP EM1 [m]) and a read-out line ROL are arranged up to the GIP area GIPA after passing through the bending area BA and the link area LA.

A sensor circuit 610 for sensing the presence or absence of abnormalities in the first to third signal lines (CL1, CL2, VSL) for delivering first to third signals (CLK1, CLK2, VST) to all or one or more of the m first light emitting control drivers (GIP EM1 [1], . . . , GIP EM1 [m]) may be disposed in the link area LA. The sensor circuit 610 may be connected to the high-level gate voltage line VGHL and the low-level gate voltage line VGLL.

The first to third signal lines (CL1, CL2, VSL) for delivering first to third signals (CLK1, CLK2, VST) to all or one or more of the m first light emitting control drivers (GIP EM1 [1], . . . , GIP EM1 [m]) are connected to all or one or more of the m first light emitting control drivers (GIP EM1 [1], . . . , GIP EM1 [m]) arranged in the GIP area GIPA after passing through the sensor circuit 610 and then passing through the electrostatic discharge circuit ESD.

The read-out line ROL may be connected to an output terminal of a last light emitting control driver (GIP EM1 [m]) of the m first light emitting control drivers (GIP EM1 [1], . . . , GIP EM1 [m]) arranged in the GIP area after passing through the sensor circuit 610 and then passing through the electrostatic discharge circuit ESD. Through this, the sensor circuit 610 may output, as a read-out signal ROS, a signal at the output terminal of the last light emitting control driver (GIP EM1 [m]). The determining circuit 620 may check whether first light emitting control signals EM1 in the m first light emitting control drivers (GIP EM1 [1], . . . , GIP EM1 [m]) are normally outputted based on the read-out signal ROS that is a sensing signal SEN.

Figure 14:
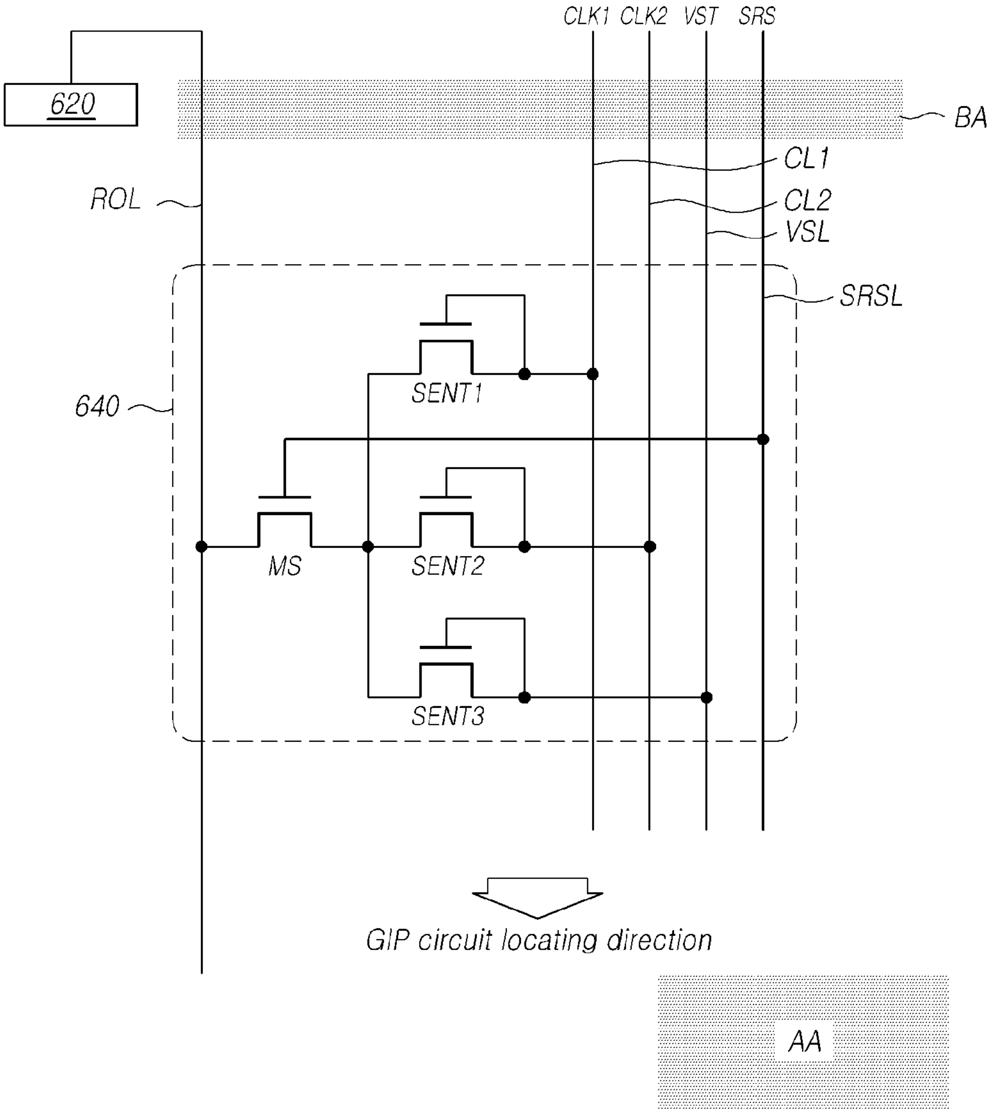
FIGS. 14, 16 and 17 illustrate sensor circuits for sensing the presence or absence of an abnormality in signal lines arranged in a bending area of the display panel according to one embodiment of the present disclosure.
Figure 15:
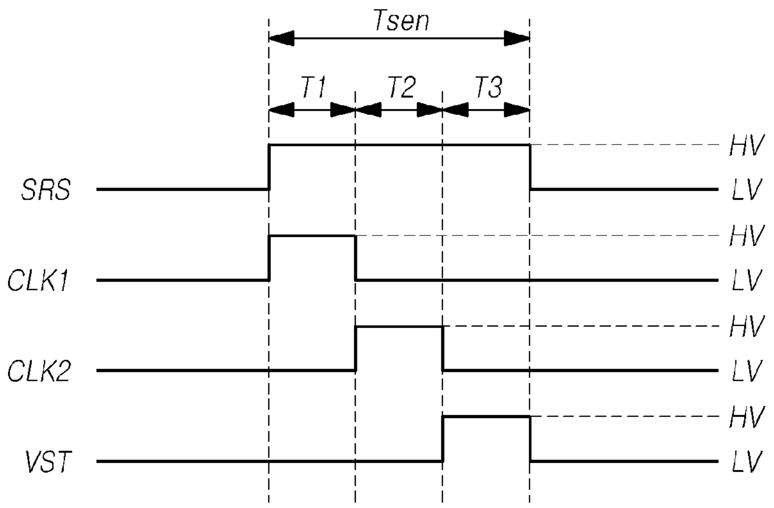
FIG. 15 is a driving timing diagram illustrating sensing operations of the sensor circuit according to one embodiment of the present disclosure.

FIG. 14 illustrates a sensor circuit 640 and a determining circuit 620 for sensing the presence or absence of an abnormality in signal lines arranged in a bending area BA of the display panel 100 according to one embodiment of the present disclosure. FIG. 15 is a driving timing diagram illustrating sensing operations of the sensor circuit 640 according to one embodiment of the present disclosure. Since configurations represented in FIG. 6 among configurations except for the sensor circuit 640 shown in FIG. 14 can be equally applicable, therefore, duplicate descriptions will be briefly given or omitted for the convenience of the description.

Referring to FIG. 14, the sensor circuit 640 may include a sensing reference signal line SRSL for delivering a sensing reference signal SRS, a read-out line ROL for delivering a read-out signal ROS to a determining circuit 620, a first sensing transistor SENT1, a second sensing transistor SENT2, a third sensing transistor SENT, a control sensing transistor MS.

The gate node of the first sensing transistor SENT1 and the drain or source node of the first sensing transistor SENT1 are connected to a first signal line CL1, and the remaining source or drain node is connected to the control sensing transistor MS. The first sensing transistor SENT1 can sense the presence or absence of an abnormality in the first signal line CL1.

The gate node of the second sensing transistor SENT2 and the drain or source node of the second sensing transistor SENT2 are connected to a second signal line CL2, and the remaining source or drain node is connected to the control sensing transistor MS. The second sensing transistor SENT2 can sense the presence or absence of an abnormality in the second signal line CL2.

The gate node of the third sensing transistor SENT3 and the drain or source node of the third sensing transistor SENT3 are connected to a start line VSL, and the remaining source or drain node is connected to the control sensing transistor MS. The third sensing transistor SENT3 can sense the presence or absence of an abnormality in the start line VSL.

The gate node of the control sensing transistor MS is connected to the sensing reference signal line SRSL, and the source or drain node thereof is connected to the first sensing transistor SENT1, the second sensing transistor SENT2, and the third sensing transistor SENT3, and the remaining drain or source node thereof is connected to the determining circuit 620 through the read-out line ROL. The first sensing transistor SENT1, the second sensing transistor SENT2, and the third sensing transistor SENT3 are commonly connected to the read-out line ROL through the control sensing transistor MS.

The first sensing transistor SENT1, the second sensing transistor SENT2, and the third sensing transistor SENT3 are electrically connected to signal lines, the sensing reference signal line, and the read-out line, and can sense the presence or absence of abnormalities in the signal lines.

A determining circuit 620 connected to the read-out line ROL can receive a read-out signal ROS from the read-out line ROL, and determine the presence or absence of abnormalities in the first signal line CL1, the second signal line CL2, or the start line VSL base on the read-out signal ROS.

Referring to FIG. 15, the sensing reference signal SRS has a high level voltage HV during an entire sensing period Tsen for the bending area BA, and has a low level voltage LV during a period except for the entire sensing period Tsen.

During the entire sensing period Tsen for the bending area BA, the high level voltage HV is sequentially provided to signal lines (CL1, CL2, VSL) for which the checking of the presence or absence of abnormalities is needed. Accordingly, respective sensing periods (T1, T2, T3) for checking the respective signal lines (CL1, CL2, VSL) may be sequentially assigned.

During a first sensing period T1 for sensing the presence or absence of an abnormality in the first signal line CL1, a high level voltage HV is applied to the first signal line CL1, and a low level voltage LV is applied to the remaining signal lines (CL2, VSL).

During a second sensing period T2 for sensing the presence or absence of an abnormality in the second signal line CL2, a high level voltage HV is applied to the second signal line CL2, and a low level voltage LV is applied to the remaining signal lines (CL1, VSL).

During a third sensing period T3 for sensing the presence or absence of an abnormality in the start line VSL, a high level voltage HV is applied to the start line VSL, and a low level voltage LV is applied to the remaining signal lines (CL1, CL2).

During the first sensing period T1, since a first signal CLK1 has a high level voltage HV, the first sensing transistor SENT1 becomes turned on. Further, since the sensing reference signal SRS has also a high level voltage HV, the control sensing transistor MS becomes turned on as well.

When the first signal line CL1 is in the normal state, the high level voltage HV applied to the first signal line CL1 is provided to the read-out line ROL through the first sensing transistor SENT1 and the control sensing transistor MS. In this case, the determining circuit 620 can read out the high level voltage HV through the read-out line ROL, and when it is identified that the read-out signal ROS corresponds to the sensing reference signal SRS, determine that the first signal line CL1 is in the normal state.

In a situation where a crack is present in the first signal line CL1 in the bending area BA, even when the high level voltage HV is applied to the first signal line CL1, the first signal CLK1 of the high level voltage HV cannot be normally applied to the gate node of the first sensing transistor SENT1 due to the crack in the first signal line CL1. According to this, the first sensing transistor SENT1 cannot be turned on. Although the control sensing transistor MS is in the turn-on state, since the first sensing transistor SENT1 is in the turn-off state, the control sensing transistor MS cannot deliver the high level voltage HV to the read-out line ROL. In this case, since the determining circuit 620 cannot read out the high level voltage HV through the read-out line ROL during the first sensing period T1, the determining circuit 620 can identify that the read-out signal ROS does not correspond to the sensing reference signal SRS, and determine that the first signal line CL1 is in an abnormal state.

During the second sensing period T2 and the third sensing period T3, respective operations of the second sensing transistor SENT2 and the third sensing transistor SENT3, and respective operations for sensing whether the signal lines (CL2, VSL are in the normal or abnormal state are substantially equal to the operation in the first sensing period T1; therefore, associated discussions will be omitted for the convenience of the description. In this case, it should be noted that the first sensing transistor SENT1 can be changed to the second sensing transistor SENT2 and the third sensing transistor SENT3, and the first signal line CL1 can be changed to the second signal line CL2 and the start line VSL, and the first signal CLK1 can be changed to a second signal CLK2 and a start signal VST.

It is possible to identify that a location on which a crack or a short in the signal lines (CL1, CL2, VSL) is present is the bending area BA, using the sensor circuit 640 and the determining circuit 620. This is because a location on which the sensor circuit 640 is disposed is a place adjacent to the bending area BA passing through the bending area BA.

Specifically, since signals applied to gate nodes of sensing transistors (SENT1, SENT2, SENT3) are applied to a place adjacent to the bending area BA, it is possible to identify the presence or absence of an abnormality in the signal lines in the bending area BA.

Meanwhile, during a display driving period in the display device 100 according to one embodiment of the present disclosure, since the sensing reference signal SRS has a low level voltage LV, the control sensing transistor MS maintains the turn-off state. Accordingly, since the control sensing transistor MS causes the signal lines (CL1, CL2, VSL) not to be electrically connected to the read-out line ROL, the associated signals (CLK1, CLK2, VST) can be normally input to the gate driving circuit 130.

Figure 16:
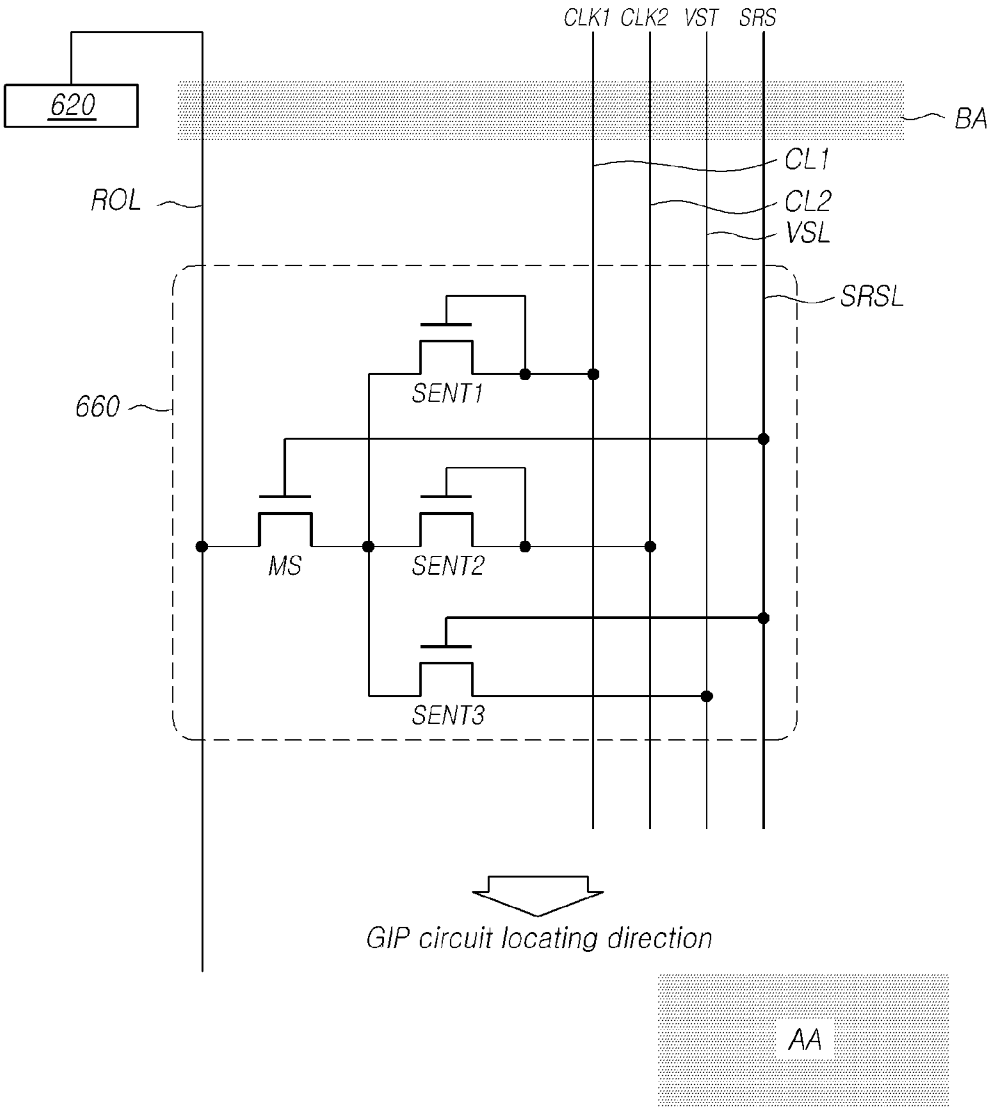

FIG. 16 illustrates a sensor circuit 660 and a determining circuit 620 for sensing the presence or absence of an abnormality in signal lines arranged in a bending area BA of the display panel 110 according to one embodiment of the present disclosure. Since a driving timing diagram for sensing operations of the sensor circuit 660 shown in FIG. 16 is substantially equal to the illustration of FIG. 15, associated discussions are conducted referring to FIG. 15. Since the sensor circuit 660 shown in FIG. 16 is a variation of the sensor circuit 640 shown in FIG. 14, discussions on associated duplicate operations will be briefly conducted or omitted for the convenience of the description.

Referring to FIG. 16, the sensor circuit 660 may include a sensing reference signal line SRSL for delivering a sensing reference signal SRS, a read-out line ROL for delivering a read-out signal ROS to a determining circuit 620, a first sensing transistor SENT1, a second sensing transistor SENT2, a third sensing transistor SENT, a control sensing transistor MS. Here, although transistors included in the sensor circuit 660 are represented as n-type transistors, however, embodiments of the present disclosure are not limited thereto.

The gate node of the first sensing transistor SENT1 and the drain or source node of the first sensing transistor SENT1 are connected to a first signal line CL1, and the remaining source or drain node is connected to the control sensing transistor MS. The first sensing transistor SENT1 can sense the presence or absence of an abnormality in the first signal line CL1.

The gate node of the second sensing transistor SENT2 and the drain or source node of the first sensing transistor SENT2 are connected to a second signal line CL2, and the remaining source or drain node is connected to the control sensing transistor MS. The second sensing transistor SENT2 can sense the presence or absence of an abnormality in the second signal line CL2.

The gate node of the third sensing transistor SENT3 is connected to the sensing reference signal line SRSL, and the drain or source node of the third sensing transistor SENT3 is connected to a start line VSL, and the remaining source or drain node is connected to the control sensing transistor MS. The third sensing transistor SENT3 can sense the presence or absence of an abnormality in the start line VSL. Since the gate node of the third sensing transistor SENT3 is connected to the sensing reference signal line SRSL, the third sensing transistor SENT3 can stably provide a low level voltage LV to the read-out line ROL during a period except for a period for sensing the presence or absence of an abnormality in the start line VSL by maintaining the turn-on state during a sensing period Tsen. Accordingly, when an abnormality is present in at least one of the remaining signal lines except for the signal line sensed by the third sensing transistor SENT3, the determining circuit 620 can accurately determine the presence or absence of the abnormality in the signal line. When signals provided to the signal lines have pluses overlapping with one another, specifically, by allowing the gate node of the third sensing transistor SENT3 to be connected to the sensing reference signal line SRSL other than the start line VSL, when a first signal CLK1 or a second signal CLK2 has a high level voltage HV while overlapping the start signal VST, it is possible to prevent an interference that may occur between signals provided to the control sensing transistor MS. The third sensing transistor SENT3 may be referred to as a reference transistor.

The gate node of the control sensing transistor MS is connected to the sensing reference signal line SRSL, and the source or drain node thereof is connected to the first sensing transistor SENT1, the second sensing transistor SENT2, and the third sensing transistor SENT3, and the remaining drain or source node thereof is connected to the determining circuit 620 through the read-out line ROL. The first sensing transistor SENT1, the second sensing transistor SENT2, and the third sensing transistor SENT3 are commonly connected to the read-out line ROL through the control sensing transistor MS.

The first sensing transistor SENT1, the second sensing transistor SENT2, and the third sensing transistor SENT3 are electrically connected to signal lines, the sensing reference signal line, and the read-out line, and can sense the presence or absence of abnormalities in the signal lines.

A determining circuit 620 connected to the read-out line ROL can receive a read-out signal ROS from the read-out line ROL, and determine the presence or absence of abnormalities in the first signal line CL1, the second signal line CL2, or the start line VSL base on the read-out signal ROS.

Referring to FIG. 15, the sensing reference signal SRS has a high level voltage HV during the entire sensing period Tsen for the bending area BA. The sensing reference signal SRS has a low level voltage LV during a period except for the entire sensing period Tsen for the bending area BA.

During the entire sensing period Tsen for the bending area BA, the high level voltage HV is sequentially provided to signal lines (CL1, CL2, VSL) for which the checking of the presence or absence of abnormalities is needed. Accordingly, respective sensing periods (T1, T2, T3) for checking the respective signal lines (CL1, CL2, VSL) may be sequentially assigned.

During a first sensing period T1 for sensing the presence or absence of an abnormality in the first signal line CL1, a high level voltage HV is applied to the first signal line CL1, and a low level voltage LV is applied to the remaining signal lines (CL2, VSL).

During a second sensing period T2 for sensing the presence or absence of an abnormality in the second signal line CL2, a high level voltage HV is applied to the second signal line CL2, and a low level voltage LV is applied to the remaining signal lines (CL1, VSL).

During a third sensing period T3 for sensing the presence or absence of an abnormality in the start line VSL, a high level voltage HV is applied to the start line VSL, and a low level voltage LV is applied to the remaining signal lines (CL1, CL2).

During the first sensing period T1, since a first signal CLK1 has a high level voltage HV, the first sensing transistor SENT1 becomes turned on. Further, since the sensing reference signal SRS has also a high level voltage HV, the control sensing transistor MS and the third sensing transistor SENT3 become turned on as well.

When the first signal line CL1 is in the normal state, the high level voltage HV applied to the first signal line CL1 is provided to the read-out line ROL through the first sensing transistor SENT1 and the control sensing transistor MS. In this case, the determining circuit 620 can read out the high level voltage HV through the read-out line ROL, and when it is identified that the read-out signal ROS corresponds to a sensing reference signal SRS, it can be determined that the first signal line CL1 is in the normal state.

In a situation where a crack is present in the first signal line CL1 in the bending area BA, even when the high level voltage HV is applied to the first signal line CL1, the first signal CLK1 of the high level voltage HV cannot be normally applied to the gate node of the first sensing transistor SENT1 due to the crack in the first signal line CL1. According to this, the first sensing transistor SENT1 is in the turn-off state. Although the control sensing transistor MS is in the turn-on state, since the first sensing transistor SENT1 is in the turn-off state, the control sensing transistor MS cannot deliver the high level voltage HV to the read-out line ROL. In this case, since the third sensing transistor SENT3 is in the turn-on state, a low level voltage LV is provided to the read-out line ROL through the control sensing transistor MS. Accordingly, the determining circuit 620 can read out the low level voltage LV through the read-out line ROL during the first sensing period T1, identify that the read-out signal ROS does not correspond to the sensing reference signal SRS, and determine that the first signal line CL1 is in an abnormal state.

During the second sensing period T2, since a second signal CLK2 has a high level voltage HV, the second sensing transistor SENT2 becomes turned on. Further, since the sensing reference signal SRS has also a high level voltage HV, the control sensing transistor MS becomes turned on as well. Operations of the sensor circuit 660 and the determining circuit 620 when the second signal line CL2 is in the normal state, and a crack is present in the second signal line CL2 in the bending area BA are substantially equal to those in the first sensing period T1; thus, associated discussions are omitted for the convenience of the description.

During the third sensing period T3, since the start signal VST and the sensing reference signal SRS have high level voltages HV, the third sensing transistor SENT3 and the control sensing transistor MS become turned on.

When the start line VSL is in the normal state, the high level voltage HV applied to the start line VSL is provided to the read-out line ROL through the third sensing transistor SENT3 and the control sensing transistor MS. In this case, the determining circuit 620 can read out the high level voltage HV through the read-out line ROL, and when it is identified that the read-out signal ROS corresponds to the sensing reference signal SRS, determine that the first signal line CL1 is in the normal state.

When a crack is present in the start line VSL in the bending area BA, since the read-out signal ROS has the high level voltage HV, the third sensing transistor SENT3 becomes turned on. However, even which the high level voltage HV is applied to the start line VSL, the start signal of the high level voltage HV cannot be normally applied to the source or drain node of the third sensing transistor SENT3 due to a crack in the start line VSL. As a result, although the control sensing transistor MS is in the turn-on state, the control sensing transistor MS cannot provide the high level voltage HV to the read-out line ROL. Accordingly, the determining circuit 620 can identify that the read-out signal ROS does not correspond to the sensing reference signal SRS during the third sensing period T3, and determine that the third signal line CL3 is in an abnormal state.

It is possible to identify that a location on which a crack or a short in the signal lines (CL1, CL2, VSL) is present is the bending area BA, using the sensor circuit 660 and the determining circuit 620. This is because a location on which the sensor circuit 660 is disposed is a place adjacent to the bending area BA.

Specifically, since signals applied to gate nodes of sensing transistors (SENT1, SENT2, SENT3) are applied to a place adjacent to the bending area BA, it is possible to identify the presence or absence of an abnormality in the signal lines in the bending area BA.

Meanwhile, during a display driving period in the display device 100 according to one embodiment of the present disclosure, since the sensing reference signal SRS has a low level voltage LV, the control sensing transistor MS and the third sensing transistor SENT3 maintain the turn-off state. Accordingly, since the control sensing transistor MS causes the signal lines (CL1, CL2, VSL) not to be electrically connected to the read-out line ROL, the associated signals (CLK1, CLK2, VST) can be normally input to the gate driving circuit 130.

Figure 17:
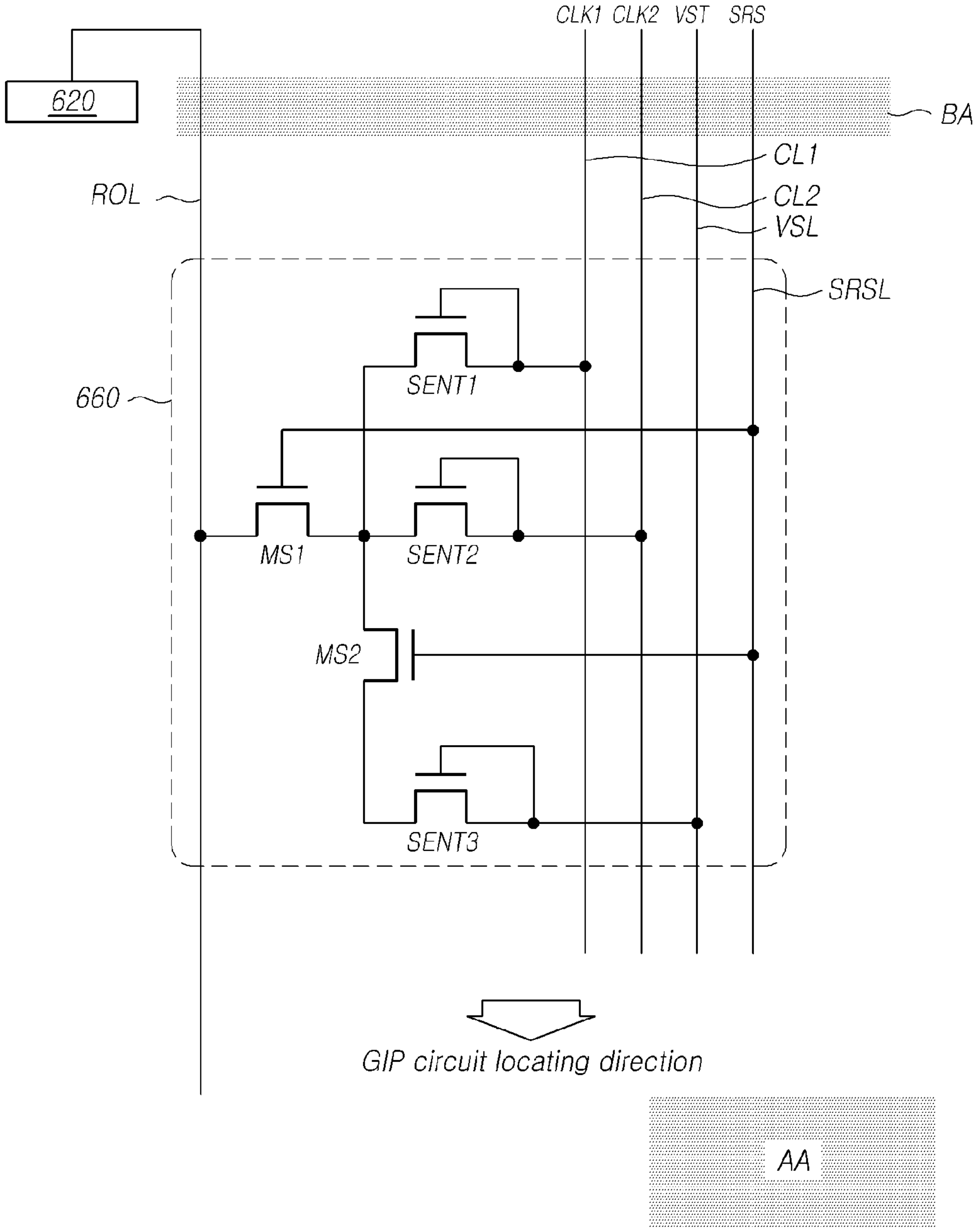

FIG. 17 illustrates a sensor circuit 680 and a determining circuit 620 for sensing the presence or absence of an abnormality in signal lines arranged in a bending area BA of the display panel 110 according to one embodiment of the present disclosure. Since a driving timing diagram for sensing operations of the sensor circuit 680 shown in FIG. 17 is substantially equal to the illustration of FIG. 15, associated discussions are conducted with reference to FIG. 15. Since the sensor circuit 680 shown in FIG. 17 is a variation of the sensor circuit 640 shown in FIG. 14, discussions on associated duplicate operations will be briefly conducted or omitted for the convenience of the description.

Referring to FIG. 17, the sensor circuit 680 may include a sensing reference signal line SRSL for delivering a sensing reference signal SRS, a read-out line ROL for delivering a read-out signal ROS to a determining circuit 620, a first sensing transistor SENT1, a second sensing transistor SENT2, a third sensing transistor SENT, and control sensing transistors (MS1, MS2). The control sensing transistors (MS1, MS2) may include a first control sensing transistor MS1 and a second control sensing transistor MS2. Here, although transistors included in the sensor circuit 680 are represented as n-type transistors, however, embodiments of the present disclosure are not limited thereto.

The gate node of the first sensing transistor SENT1 and the drain or source node of the first sensing transistor SENT1 are connected to a first signal line CL1, and the remaining source or drain node is connected to the control sensing transistors (MS1, MS2). The first sensing transistor SENT1 can sense the presence or absence of an abnormality in the first signal line CL1.

The gate node of the second sensing transistor SENT2 and the drain or source node of the second sensing transistor SENT2 are connected to a second signal line CL2, and the remaining source or drain node is connected to the control sensing transistors (MS1, MS2). The second sensing transistor SENT2 can sense the presence or absence of an abnormality in the second signal line CL2.

The gate node of the third sensing transistor SENT3 and the drain or source node of the third sensing transistor SENT3 are connected to a start line VSL, and the remaining source or drain node is connected to the second control sensing transistor MS2. The third sensing transistor SENT3 can sense the presence or absence of an abnormality in the start line VSL.

The gate node of the first control sensing transistor MS1 is connected to the sensing reference signal line SRSL, and the source or drain node of the first control sensing transistor MS1 is connected to the first sensing transistor SENT1, the second sensing transistor SENT2, and the second control sensing transistor MS2, and the remaining drain or source node of the first control sensing transistor MS1 is connected to the determining circuit 620 through the read-out line ROL.

The gate node of the second control sensing transistor MS2 is connected to the sensing reference signal line SRSL, and the source or drain node of the second control sensing transistor MS2 is connected to the third sensing transistor SENT3, and the remaining drain or source node of the second control sensing transistor MS2 is connected to the first control sensing transistor MS1.

The first sensing transistor SENT1 and the second sensing transistor SENT2 are commonly connected to the read-out line ROL through the first control sensing transistor MS1. Further, the third sensing transistor SENT3 is connected to the read-out line ROL through the first control sensing transistor MS2 and the second control sensing transistor MS1.

The first sensing transistor SENT1, the second sensing transistor SENT2, and the third sensing transistor SENT3 are electrically connected to signal lines, the sensing reference signal line, and the read-out line, and can sense the presence or absence of abnormalities in the signal lines.

A determining circuit 620 connected to the read-out line ROL can receive a read-out signal ROS from the read-out line ROL, and determine the presence or absence of abnormalities in the first signal line CL1, the second signal line CL2, or the start line VSL base on the read-out signal ROS.

Referring to FIG. 15, the sensing reference signal SRS has a high level voltage HV during an entire sensing period Tsen for the bending area BA, and has a low level voltage LV during a period except for the entire sensing period Tsen.

During the entire sensing period Tsen for the bending area BA, the high level voltage HV is sequentially provided to signal lines (CL1, CL2, VSL) for which the checking of the presence or absence of abnormalities is needed. Accordingly, respective sensing periods (T1, T2, T3) for checking the respective signal lines (CL1, CL2, VSL) may be sequentially assigned.

During a first sensing period T1 for sensing the presence or absence of an abnormality in the first signal line CL1, a high level voltage HV is applied to the first signal line CL1, and a low level voltage LV is applied to the remaining signal lines (CL2, VSL).

During a second sensing period T2 for sensing the presence or absence of an abnormality in the second signal line CL2, a high level voltage HV is applied to the second signal line CL2, and a low level voltage LV is applied to the remaining signal lines (CL1, VSL).

During a third sensing period T3 for sensing the presence or absence of an abnormality in the start line VSL, a high level voltage HV is applied to the start line VSL, and a low level voltage LV is applied to the remaining signal lines (CL1, CL2).

During the first sensing period T1, since a first signal CLK1 has a high level voltage HV, the first sensing transistor SENT1 becomes turned on. Further, since the sensing reference signal SRS has also a high level voltage HV, the first control sensing transistor MS1 becomes turned on as well.

When the first signal line CL1 is in the normal state, the high level voltage HV applied to the first signal line CL1 is provided to the read-out line ROL through the first sensing transistor SENT1 and the first control sensing transistor MS1. In this case, the determining circuit 620 can read out the high level voltage HV through the read-out line ROL, and when it is identified that the read-out signal ROS corresponds to the sensing reference signal SRS, determine that the first signal line CL1 is in the normal state.

In a situation where a crack is present in the first signal line CL1 in the bending area BA, even when the high level voltage HV is applied to the first signal line CL1, the first signal CLK1 of the high level voltage HV cannot be normally applied to the gate node of the first sensing transistor SENT1 due to the crack in the first signal line CL1. According to this, the first sensing transistor SENT1 cannot be turned on. Although the first control sensing transistor MS1 is in the turn-on state, since the first sensing transistor SENT1 is in the turn-off state, the first control sensing transistor MS1 cannot deliver the high level voltage HV to the read-out line ROL. In this case, since the determining circuit 620 cannot read out the high level voltage HV through the read-out line ROL during the first sensing period T1, the determining circuit 620 can identify that the read-out signal ROS does not correspond to the sensing reference signal SRS, and determine that the first signal line CL1 is in an abnormal state.

During the second sensing period T2, an operation of the second sensing transistor SENT2 and an operation for sensing whether the second signal line CL2 is in the normal or abnormal state are substantially equal to the operation in the first sensing period T1; therefore, associated discussions will be omitted for the convenience of the description. In this case, it should be noted that the first sensing transistor SENT1 can be changed to the second sensing transistor SENT2, and the first signal line CL1 can be changed to the second signal line CL2, and the first signal CLK1 can be changed to a second signal CLK2.

During the third sensing period T3, since a start signal VST has a high level voltage HV, the third sensing transistor SENT3 becomes turned on. Further, since the sensing reference signal SRS has also a high level voltage HV, the first control sensing transistor MS1 and the second control sensing transistor MS2 become turned on as well.

When the start signal line VSL is in the normal state, the high level voltage HV applied to the start signal line VSL is provided to the read-out line ROL through the third sensing transistor SENT3, the second control sensing transistor MS2. and the first control sensing transistor MS1. In this case, the determining circuit 620 can read out the high level voltage HV through the read-out line ROL, and when it is identified that the read-out signal ROS corresponds to the sensing reference signal SRS, determine that the start signal line VSL is in the normal state.

In a situation where a crack is present in the start signal line VSL in the bending area BA, even when the high level voltage HV is applied to the start signal line VSL, the start signal VST of the high level voltage HV cannot be normally applied to the gate node of the third sensing transistor SENT3 due to the crack in the start signal line VSL. According to this, the third sensing transistor SENT3 cannot be turned on. Although the first control sensing transistor MS1 and the second control sensing transistor MS2 are in the turn-on state, since the third sensing transistor SENT3 is in the turn-off state, the high level voltage HV cannot be delivered to the read-out line ROL. In this case, since the determining circuit 620 cannot read out the high level voltage HV through the read-out line ROL during the third sensing period T3, the determining circuit 620 can identify that the read-out signal ROS does not correspond to the sensing reference signal SRS, and determine that the start signal line VSL is in an abnormal state.

It is possible to identify that a location on which a crack or a short in the signal lines (CL1, CL2, VSL) is present is the bending area BA, using the sensor circuit 680 and the determining circuit 620. This is because a location on which the sensor circuit 680 is disposed is a place adjacent to the bending area BA passing through the bending area BA.

Specifically, since signals applied to gate nodes of sensing transistors (SENT1, SENT2, SENT3) are applied to a place adjacent to the bending area BA, it is possible to identify the presence or absence of an abnormality in the signal lines in the bending area BA.

Meanwhile, during a display driving period in the display device 100 according to one embodiment of the present disclosure, since the sensing reference signal SRS has a low level voltage LV, the control sensing transistors (MS1, MS2) maintain the turn-off state. Accordingly, since the control sensing transistors (MS1, MS2) cause the signal lines (CL1, CL2, VSL) not to be electrically connected to the read-out line ROL, the associated signals (CLK1, CLK2, VST) can be normally input to the gate driving circuit 130.

For example, in the display driving, the gate driving circuit 130 can be operated by signals, such as, the first signal CLK1 and the second signal CLK2 toggling from each other and not having a period in which the high level voltages HV thereof overlap with each other, and the start signal VST having a period in which the high level voltage HV of the start signal VST overlaps with the high level voltages HV of the first signal CLK1 and the second signal CLK2. In this case, if the second control sensing transistor MS2 is not included, as overlapped signals are applied to nodes connected between the first control sensing transistor MS1 and the sensing transistors (SENT1, SENT2, SENT3), an interference between signals may occur, and in turn, this causes a problem in driving a gate driving circuit. Therefore, by disposing the second control sensing transistor MS2 between the third sensing transistor SENT3 for sensing the start signal VST that may overlap with another signal and the first control sensing transistor MS1, it is possible to prevent signals from being interfered from one another, and enable the gate driving circuit to be operated normally.

In addition, as shown in FIG. 6, the read-out line ROL of FIGS. 14, 16 and 17 may include a portion (PART1) located in the link area LA and a portion (PART2) located outside of a side edge area of the active area AA. In another embodiment, a control transistor may be further included that is connected in series to the read-out line ROL, and can connect or disconnect between the portion (PART1) in the link area LA and the portion (PART2) outside of the side edge area of the active area AA of the read-out line ROL. This control transistor can perform equal function to the second control transistor M2 discussed with reference to FIG. 6; thus, associated discussions are omitted for the convenience of the description.

Further, the signal lines (CLK1, CLK2, VST) associated with the embodiments described above are signals input to a gate driving circuit; however, embodiments of the present disclosure are not limited thereto. The signal lines may be changed or modified, or the number of the gate driving circuits may increase, according to structures of the gate driving circuit.

A display device according to the embodiments of the present disclosure can be described as follows.

In accordance with one aspect of the present disclosure, a display device is provided that includes a substrate including an active area in which a plurality of subpixels are arranged and images are displayed, and a non-active area that is an area outside of the active area, a data driving circuit that supplies data signals to the plurality of subpixels, a gate driving circuit that supplies gate signals to the plurality of subpixels, and a sensor circuit that senses the presence or absence of an abnormality in a signal line connected to the gate driving circuit. Further, the non-active area of the substrate includes a driving circuit area to which the data driving circuit is electrically connected, a bending area that is located between the driving circuit area and the active area, and that can be bent, and a link area between the bending area and the active area. The sensor circuit includes a sensing reference signal line providing a sensing reference signal, a read-out line providing a read-out signal, and a sensing transistor electrically connected to at least one signal line, the sensing reference signal line, and the read-out line. In this case, the sensor circuit may be disposed in the link area. Accordingly, it is possible to recognize accurately where an abnormality of a signal line has occurred, and correct the corresponding defect.

In accordance with one embodiment of the present disclosure, the display device may further include a determining circuit that is electrically connected to the read-out line, receives a read-out signal from the read-out line, and determines the presence or absence of an abnormality in a signal line based on the read-out signal. Further, when it is determined that a signal line is in an abnormal state, the determining circuit can control identification information or location information of the signal line or information resulted from the determining to be stored in a memory or displayed on a screen.

In the display device according to one embodiment of the present disclosure, during a sensing period for sensing the presence or absence of an abnormality in a signal line, a signal with a turn-on level of voltage of a sensing transistor may be applied to the signal line, and a sensing reference signal with a voltage identical to the turn-on level of voltage may be applied to the sensing reference signal line.

In the display device according to one embodiment of the present disclosure, during a sensing period for sensing the presence or absence of an abnormality in a signal line, when a signal with a turn-on level of voltage of a sensing transistor is applied to the signal line, the sensing transistor may be in a turn-on state or a turn-off state depending on whether a crack is present in the signal line.

In the display device according to one embodiment of the present disclosure, the determining circuit can determine that when a read-out signal ROS corresponds to the sensing reference signal, an associated signal line is in the normal state, and when the read-out signal ROS does not correspond to the sensing reference signal, the signal line is in an abnormal state.

In the display device according to one embodiment of the present disclosure, the sensor circuit may further include a control sensing transistor controlled by the sensing reference signal.

In the display device according to one embodiment of the present disclosure, the read-out line may be disposed to extend to an outside of a side edge area of the active area, and include a portion in the link area and a portion outside of the side edge area of the active area.

In the display device according to one embodiment of the present disclosure, the gate driving circuit is disposed on the substrate and includes a plurality of gate drivers in the Gate in panel (GIP) type, and an end of the portion of the read-out line which is outside of the side edge area of the active area may be electrically connected to an output terminal of a last gate driver disposed farthest from the bending area among the plurality of gate drivers.

In the display device according to one embodiment of the present disclosure, the control sensing transistor can be turned on based on the sensing reference signal during a sensing period for sensing the presence or absence of an abnormality in a signal line, and be turned off by the sensing reference signal during a display driving period.

In accordance with one aspect of the present disclosure, a display device including a bending area includes signal line disposed to pass the bending area, a sensor circuit connected to the signal line, and a determination circuit determining an abnormality in a signal line based on information obtained by the sensing of the sensor circuit. Further, the sensor circuit includes a read-out line connected to the determining circuit, a sensing reference signal line providing a sensing reference signal for comparing information received by the determining circuit from the sensor circuit, a sensing transistor connected to the signal line, and a control sensing transistor connected to the sensing reference signal line, the read-out line, and the sensing transistor. Accordingly, it is possible to recognize accurately where an abnormality of a signal line has occurred, and correct the corresponding defect.

In the display device according to one embodiment of the present disclosure, the sensor circuit may include two or more of signal lines and two or more of sensing transistors, and the control sensing transistor may be commonly connected to the two or more sensing transistors.

Further, the two or more sensing transistors may be sequentially turned on during a sensing period for determining the presence or absence of an abnormality in the two or more of signal lines.

In the display device according to one embodiment of the present disclosure, the gate node of a sensing transistor and the source or drain node of the sensing transistor may be electrically connected to a signal line, and a node not connected to the signal line of the source and drain nodes of the sensing transistor may be connected to the control sensing transistor.

In the display device according to one embodiment of the present disclosure, the two or more signal lines may include signal lines having (delivering) respective signals with pulses overlapping with each other; the control sensing transistor may include a first control sensing transistor and a second control sensing transistor; the first control sensing transistor may be connected between a sensing transistor connected to one of the signal lines and the read-out line; and the second control sensing transistor may be connected between a sensing transistor connected to another of the signal lines and the first control sensing transistor. Further, the first control sensing transistor and the second control sensing transistor may be controlled by a sensing reference signal, and the sensing reference signal may have a turn-on level of voltage capable of turning on the first control sensing transistor and the second control sensing transistor during a sensing period for sensing the presence or absence of an abnormality in the signal lines.

In the display device according to one embodiment of the present disclosure, the sensor circuit may be disposed to be adjacent to the bending area.

The display device according to one embodiment of the present disclosure may further include an electrostatic discharge circuit to which at least one signal line, the read-out line, and the sensing reference signal line are connected.

In the display device according to one embodiment of the present disclosure, the signal lines may be longer than the sensing reference signal line.

In accordance with embodiments of the present disclosure, in implementing a narrow bezel by applying a bending structure to a display panel, to solve such problems that it is difficult to check the presence or absence of an abnormality in signal lines located in the bending area through visual inspection or inspection equipment etc. due to some limitations in a panel structure, a panel fabricating process, or the like, a display device can be provided that is capable of accurately sensing the presence or absence of the abnormality in signal lines located in the bending area.

Through these, a display device 100 can be provided that enables an accurate check to be performed for the presence or absence of an abnormality, such as a crack, or the like in signal lines located in the bending area BA, and thus, has a normal bending structure without defects.

Further, in accordance with embodiments of the present disclosure, a display device 100 can be provided that enables an abnormality in signal lines which would occur in the bending area BA after the panel have been fabricated to be detected, and thus, enables an action for the abnormality to be taken.

In accordance with embodiments of the present disclosure, a display device can be provided that is capable of identifying whether an abnormality in signal lines is present in the bending area or in another area except for the bending area.

The present disclosure described above is not limited to the embodiments described above and accompanying drawings, but may be implemented in various different forms. Various modifications, additions and substitutions to the described embodiments will be readily apparent to those skilled in the art, and the general principles defined herein may be applied to other embodiments and applications without departing from the spirit and scope of the present invention. The scope of protection of the present disclosure should be construed based on the following claims, and all technical ideas within the scope of equivalents thereof should be construed as being included within the scope of the present disclosure.

In addition, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device comprising:

a substrate including an active area in which a plurality of subpixels are arranged and images are displayed, and a non-active area that is an area outside of the active area;

an organic light emitting diode included in each of the plurality of subpixels;

a data driving circuit configured to supply data signals to the plurality of subpixels;

a gate driving circuit including a plurality of scan drivers configured to supply scan signals to the plurality of subpixels through a plurality of scan lines;

a sensor circuit configured to sense a presence or an absence of an abnormality in a portion of at least one signal line for delivering at least one type of signal to the gate driving circuit; and an electrostatic discharge circuit connected to the at least one signal line, wherein the non-active area of the substrate comprises:

a driving circuit area where the data driving circuit is disposed;

a bending area located between the driving circuit area and the active area, the bending area configured to be bent; and a link area between the bending area and the active area, wherein the sensor circuit comprises:

a sensing reference signal line that delivers a sensing reference signal;

a read-out line that delivers a read-out signal; and at least one sensing transistor which is a first node is electrically connected to the at least one signal line and a second node is electrically connected to the sensing reference signal line, and the read-out line; and a control sensing transistor that is controlled by the sensing reference signal and connected between a third node of the at least one sensing transistor and the read-out line.

2. The display device according to claim 1, wherein the sensor circuit is configured to sense a presence or an absence of the abnormality in the at least one signal line of the bending area while being disposed in the link area between the bending area and the active area.

3. The display device according to claim 1, wherein the electrostatic discharge circuit is in the link area.

4. The display device according to claim 1, further comprising:

at least one scan driver from the plurality of scan drivers is located outside of at least one of a left edge area and a right edge area of the active area, wherein the sensing reference signal line does not extend up to the at least one scan driver while being connected to the sensor circuit and the electrostatic discharge circuit.

5. The display device according to claim 4, wherein at least one of the signal line or the read-out line is connected to the at least one scan driver after passing through the sensor circuit and the electrostatic discharge circuit.

6. The display device according to claim 1, further comprising:

at least one light emitting control driver located outside of at least one of a left edge area and a right edge area of the active area, wherein at least one of the at least one signal line or the read-out line is connected to the at least one light emitting control driver after passing through the sensor circuit and the electrostatic discharge circuit.

7. The display device according to claim 1, further comprising:

a data distribution circuit in the link area after passing through the bending area.

8. The display device according to claim 1, wherein the substrate is a flexible substrate.

9. The display device according to claim 1, further comprising:

a determining circuit electrically connected to the read-out line, the determining circuit configured to receive the read-out signal from the read-out line, and determine the presence or the absence of the abnormality in the at least one signal line based on the read-out signal.

10. The display device according to claim 9, wherein responsive to determining that the at least one signal line is in an abnormal state, the determining circuit is configured to control identification information or location information of the at least one signal line or information resulting from the determination to be stored in a memory or displayed on a screen.

11. The display device according to claim 1, wherein during a sensing period during which the presence or the absence of the abnormality in the at least one signal line is sensed, a signal with a turn-on level of a voltage of the sensing transistor is applied to the at least one signal line, and the sensing reference signal with a voltage identical to the turn-on level of voltage is applied to the sensing reference signal line.

12. The display device according to claim 11, wherein during the sensing period during which the presence or the absence of the abnormality in the at least one signal line is sensed, responsive to the signal with the turn-on level of voltage of the sensing transistor being applied to the at least one signal line, the sensing transistor is in a turn-on state or in a turn-off state depending on whether the at least one signal line is cracked.

13. The display device according to claim 10, wherein responsive to the read-out signal corresponding to the sensing reference signal, the determining circuit determines that the at least one signal line is in a normal state, and responsive to the read-out signal not corresponding to the sensing reference signal, the determining circuit determines that the at least one signal line is in an abnormal state.

14. The display device according to claim 1, wherein the read-out line is disposed to extend to an outside of a side edge area of the active area, and includes a portion in the link area and a portion outside of the side edge area of the active area.

15. The display device according to claim 14, wherein the gate driving circuit includes a plurality of gate drivers formed in a gate in panel type and disposed over the substrate, and wherein one end of the portion outside of the side edge area of the active area in the read-out line is electrically connected to an output terminal of a last gate driver from the plurality of gate drivers that is farthest from the bending area among the plurality of gate drivers.

16. The display device according to claim 1, wherein the control sensing transistor is turned on by the sensing reference signal during a sensing period for sensing the presence or the absence of the abnormality in the at least one signal line, and is turned off by the sensing reference signal during a display driving period.

17. The display device according to claim 1, further comprising:

a second control sensing transistor that is controlled by the sensing reference signal and connected between the third node of a first sensing transistor and the third node of a second sensing transistor.

* * * * *